United States Patent
Yoneyama et al.

(10) Patent No.: US 7,695,781 B2
(45) Date of Patent: Apr. 13, 2010

(54) ANTIREFLECTIVE FILM, POLARIZING PLATE INCLUDING THE SAME, IMAGE DISPLAY UNIT INCLUDING THE SAME AND METHOD FOR PRODUCING ANTIREFLECTIVE FILM

(75) Inventors: Hiroyuki Yoneyama, Minami-Ashigara (JP); Yukihiko Kanazawa, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1375 days.

(21) Appl. No.: 11/058,652

(22) Filed: Feb. 16, 2005

(65) Prior Publication Data
US 2005/0181146 A1    Aug. 18, 2005

(30) Foreign Application Priority Data
Feb. 16, 2004  (JP)  ............................. 2004-037859

(51) Int. Cl.
G02F 1/1335     (2006.01)
(52) U.S. Cl. .................. 428/1.32; 349/137; 359/586; 428/1.31
(58) Field of Classification Search ............ 428/1.1, 428/1.3, 1.31, 1.32; 349/137; 359/580, 586, 359/599
See application file for complete search history.

(56) References Cited

U.S. PATENT DOCUMENTS

| 5,665,422 | A * | 9/1997 | Endo et al. ............ 427/71 |
| 5,925,438 | A * | 7/1999 | Ota et al. ............ 428/141 |
| 6,251,523 | B1 * | 6/2001 | Takahashi et al. ........ 428/428 |
| 2001/0050741 | A1 * | 12/2001 | Hokazono et al. ........ 349/137 |
| 2003/0087102 | A1 * | 5/2003 | Yamaya et al. .......... 428/419 |
| 2003/0139620 | A1 * | 7/2003 | Yamaguchi et al. ...... 556/445 |
| 2003/0147140 | A1 * | 8/2003 | Ito ..................... 359/599 |
| 2003/0176124 | A1 * | 9/2003 | Koike et al. ........... 442/16 |
| 2003/0194533 | A1 * | 10/2003 | Amimori et al. ........ 428/143 |
| 2003/0201163 | A1 * | 10/2003 | Teng ................ 204/192.26 |
| 2003/0232155 | A1 * | 12/2003 | Obayashi et al. ........ 428/1.32 |
| 2004/0016914 | A1 * | 1/2004 | Matsuda et al. ......... 252/500 |

(Continued)

FOREIGN PATENT DOCUMENTS

JP          63-21601         1/1988

(Continued)

OTHER PUBLICATIONS

Official Action issued in corresponding Japanese Patent Application No. 2005-033179 on Dec. 2, 2009, together with an English language translation of the Official Action.

*Primary Examiner*—Sophie Hon
(74) *Attorney, Agent, or Firm*—Buchanan Ingersoll & Rooney PC

(57) ABSTRACT

An antireflective film comprising a transparent substrate and a low refractive index layer formed by coating a low refractive index layer-forming composition, wherein the low refractive index layer-forming composition contains at least one of a hydrolysate of an organosilyl compound represented by the following formula (1) and a partial condensation product of the hydrolysate, and an outermost face of the antireflective film has a centerline surface roughness Ra of from 0.005 to 0.20 μm:

$$R^{11}{}_m Si(X^{11})_n \quad (1)$$

wherein $X^{11}$ represents —OH, a halogen atom, —OR$^{12}$ or —OCOR$^{12}$ in which R$^{12}$ represents an alkyl group; R$^{11}$ represents an alkyl group, an alkenyl group or an aryl group; and m and n are each a positive integer provided that m+n is 4.

15 Claims, 1 Drawing Sheet

U.S. PATENT DOCUMENTS

| | | | |
|---|---|---|---|
| 2004/0156110 A1* | 8/2004 | Ikeyama | 359/603 |
| 2005/0109238 A1* | 5/2005 | Yamaki et al. | 106/287.16 |
| 2005/0152038 A1* | 7/2005 | Nishida et al. | 359/601 |
| 2006/0057307 A1* | 3/2006 | Matsunaga et al. | 428/1.31 |
| 2007/0146887 A1* | 6/2007 | Ikeda et al. | 359/586 |

FOREIGN PATENT DOCUMENTS

| | | |
|---|---|---|
| JP | 8-211202 | 8/1996 |
| JP | 10-728 | 1/1998 |
| JP | 10-219136 A | 8/1998 |
| JP | 2001-255403 A | 9/2001 |
| JP | 2002-079600 A | 3/2002 |
| JP | 2002-235018 A | 8/2002 |
| JP | 2002-265866 | 9/2002 |
| JP | 2002-275403 | 9/2002 |
| JP | 2002-277604 | 9/2002 |
| JP | 2002-311240 A | 10/2002 |
| JP | 2003-222704 A | 8/2003 |
| JP | 2003-236205 A | 8/2003 |
| JP | 2003-315505 A | 11/2003 |
| JP | 2003-329804 A | 11/2003 |
| JP | 2004-526606 A | 9/2004 |
| WO | WO-02075373 A1 * | 9/2002 |
| WO | WO 02/096628 A2 | 12/2002 |
| WO | WO-03035780 A1 * | 5/2003 |
| WO | WO 03091761 A1 * | 11/2003 |
| WO | WO 2004017105 A1 * | 2/2004 |
| WO | WO 2005063484 A1 * | 7/2005 |

* cited by examiner

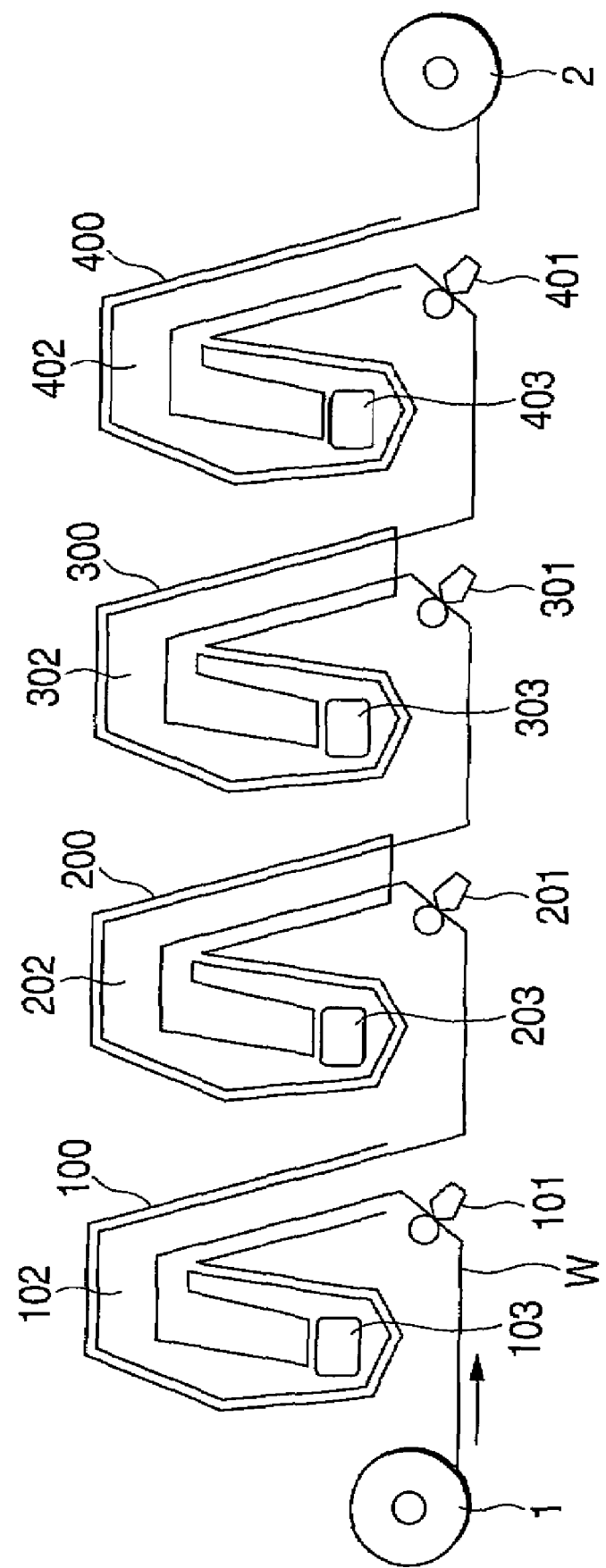

ANTIREFLECTIVE FILM, POLARIZING PLATE INCLUDING THE SAME, IMAGE DISPLAY UNIT INCLUDING THE SAME AND METHOD FOR PRODUCING ANTIREFLECTIVE FILM

FIELD OF THE INVENTION

This invention relates to an antireflective film having a low refractive index and being excellent in scratch resistance, antifouling properties and durability, a polarizing plate using the same, and an image display unit using the same. It further relates to an antireflective film showing reduced glare and an enlarged viewing angle, a polarizing plate using the same, and an image display unit using the same.

BACKGROUND OF THE INVENTION

An antireflective film is employed in general to lower the refractive index with the use of the optical interference principle so as to prevent a decrease in contrast or image transfer caused by the reflection of outside light in image display units such as a cathode-ray tube (CTR), a plasma display panel (PDP), an electro luminescence display (ELD) and a liquid crystal display (LCD). Various attempts have been made to achieve display performance with lessened glare by, for example, forming an antiglare layer having patterned indented surface so as to scatter reflected light, or employing particles having a refractive index different from a binder so as to diffuse light inside an image display unit and enlarge the viewing angle.

Since image display units are to be used over a long time under various environments, they should be highly durable. In the case where the refractive index is lowered with the use of optical interference, there arises a problem that deterioration in the optical interference layer would cause worsening in the effect of lowering the refractive index. Moreover, non-uniform deterioration in an optical thin film results in surface irregularities thereby causing noticeable defects. Since an antireflective film is to be employed as the outermost face, it is expected that such an antireflective film also serves as a protective film of an image display unit. That is, it should be highly resistant to the sticking of dust and debris and have excellent scratch resistance.

As a protective film having excellent scratch resistance, it has been known to use a sol-gel film of hydrolytic condensation product an alkoxysilane. For example, JP-A-10-728 discloses an antireflective film of the three-layered optical interference type, JP-A-63-21601 discloses a method of lowering refractive index by forming a sol-gel film on a plastic substrate, JP-A-8-211202 discloses a sol-gel film containing an alkoxysilane and inorganic fine particles having a low refractive index, JP-A-2002-275403 discloses a sol-gel film of an organosilyl compound containing ethylenically unsaturated group, JP-A-2002-277604 discloses the combination of a sol-gel film with an antifouling layer, and JP-A-2002-265866 discloses a low refractive index coating agent comprising a fluorinated organosilane.

Although sol-gel films generally have favorable initial strength, they suffer from such problems as being fragile and frequently fouled. Moreover, they are insufficient in the durability under storage conditions with, in particular, a high humidity or wide temperature swings or in an ozone-containing atmosphere and, therefore, it has been required to overcome these problems. Although the antifouling properties can be improved by using a fluorinated organosilyl compound together, there arise some troubles in this case, for example, lowering in film strength, increase in electrostatic charge or serious sticking of dust and debris.

SUMMARY OF THE INVENTION

As described above, the antireflective films proposed hitherto are still insufficient in simultaneous achievement of excellent display performance with a low reflectivity and favorable scratch resistance and antifouling properties. Therefore, it has been urgently required to develop an antireflective film capable of fulfilling both of these requirements.

An object of the invention is to provide an antireflective film having a low reflectivity and being excellent in scratch resistance, antifouling properties and durability. Another object thereof is to provide an antireflective film showing reduced glare and an enlarged viewing angle. Still another object thereof is to provide a polarizing plate and an image display unit using such an antireflective film.

The present inventors have conducted intensive studies and, as a result, found out that the above-described objects can be established by forming a low refractive index layer by using at least one of a hydrolysate of a specific organosilyl compound and a partial condensation product of the hydrolysate and, further, controlling the centerline surface roughness (Ra) of the outermost face thereof within a specific range.

In the invention, therefore, the above-described objects have been established by the following constitutions.

(1) An antireflective film having an antireflective layer comprising at least a low refractive index layer formed by applying a low refractive index layer-forming composition to a transparent substrate, wherein the low refractive index layer-forming composition contains at least one of a hydrolysate of an organosilyl compound represented by the formula (1) and a partial condensation product of the hydrolysate, and the centerline surface roughness (Ra) of the outermost face of the antireflective film is from 0.005 to 0.20 μm:

$$R^{11}{}_m Si(X^{11})_n \qquad \text{formula (1):}$$

wherein $X^{11}$ represents —OH, a halogen atom, an —OR$^{12}$ group or an —OCOR$^{12}$ group (wherein R$^{12}$ represents an alkyl group); R$^{11}$ represents an alkyl group, an alkenyl group or an aryl group; and m and n are each a positive integer provided that m+n is 4.

(2) An antireflective film as described in the above (1), wherein the low refractive index layer contains inorganic fine particles having a refractive index of from 1.17 to 1.40, having an average particle size corresponding to 30% or more but not more than 120% of the thickness of the low refractive index layer and having a hollow structure.

(3) An antireflective film as described in the above (1) or (2), wherein the surface free energy of the outermost face is 26 mJ/m$^2$ or less.

(4) An antireflective film as described in any of the above (1) to (3), wherein the antireflective film is a multilayered film further having a hard coat layer, at least one layer constituting the antireflective layer is a light diffusion layer comprising at least one type of light-transmitting particles, which have an average particle size of from 0.1 to 5 μm and are dispersed in a light-transmitting resin, the difference in refractive index between the light-transmitting particles and the light-transmitting resin is from 0.02 to 0.2, and the light diffusion layer contains from 3 to 30% by weight, based on the total solid matters, of the light-transmitting particles.

(5) An antireflective film as described in any of the above (1) to (4) further having a transparent antistatic layer having an electrically conductive material, wherein the surface resistance logSR of the antireflective film is 12 or less.

(6) An antireflective film as described in the above (4), wherein the hard coat layer is formed by applying a hard coat layer-forming composition which contains at least one of an organosilyl compound represented by the formula (1), a hydrolysate of the organosilyl compound and a partial condensation product of the hydrolysate.

(7) An antireflective film as described in the above (4) or (6), wherein the hard coat layer-forming composition contains a polyfunctional isocyanate compound.

(8) An antireflective film as described in the above (4), (6) or (7), wherein the centerline surface roughness Ra of the hard coat layer is from 0.005 to 0.20 µm.

(9) An antireflective film as described in any of the above (1) to (8), wherein at least one of the layers constituting the antireflective film contains a thixotropic agent.

(10) An antireflective film as described in any of the above (1) to (9) which has an antifouling layer on the low refractive index layer.

(11) An antireflective film as described in any of the above (1) to (9), wherein the low refractive index layer is formed on an alkali-treated face.

(12) An antireflective film as described in any of the above (1) to (11), wherein, in the rubbing test with cotton swab moistened with water, the critical load of the antireflective film surface after exposing to 10 ppm of ozone for 192 hours is 400 g or more.

(13) A polarizing plate having an antireflective film as described in any of the above (1) to (11).

(14) A polarizing plate as described in the above (13), wherein the Re retardation value of at least one film constituting the polarizing plate is at least 20 but not more than 70 nm and the Rth retardation value thereof is at least 70 but not more than 400 nm.

(15) A polarizing plate as described in the above (13) or (14), wherein, in the rubbing test with cotton swab moistened with water, the critical load of the antireflective film surface after exposing to 10 ppm of ozone for 192 hours is 400 g or more.

(16) A display unit having an antireflective film as described in any of the above (1) to (12) or a polarizing plate as described in any of the above (13) to (15).

(17) A display unit as described in the above (16), wherein, in the rubbing test with cotton swab moistened with water, the critical load of the antireflective film surface after exposing to 10 ppm of ozone for 192 hours is 400 g or more.

The antireflective film according to the invention has sufficient antireflective properties and is excellent in scratch resistance, antifouling properties and durability. The image display unit provided with the antireflective film according to the invention and the image display unit provided with the polarizing plate with the use of the antireflective film according to the invention suffer from little reflection of outside light or background and have large viewing angles, thereby achieving excellent visibility.

BRIEF DESCRIPTION OF THE DRAWINGS

FIG. 1 is a schematic drawing which shows an embodiment of the coating apparatus preferably employed in the invention.

DESCRIPTION OF THE REFERENCE NUMERALS AND SIGNS

| W | web |
|---|---|
| 1 | substrate film roll |
| 2 | winding roll |
| 100, 200, 300, 400 | layer-forming unit |
| 101 | coating part |
| 102 | drying part |
| 103 | hardening device |

DETAILED DESCRIPTION OF THE INVENTION

Now, the invention will be described in greater detail.

The expression "from (numerical value A) to (numerical value B)" as used herein in numerically indicating characteristics, physical properties or the like means "at least (numerical value A) but not more than (numerical value B)".

The antireflective film according to the invention has an antireflective layer comprising at least a low refractive index layer formed by applying a low refractive index layer-forming composition to a transparent substrate, wherein the low refractive index layer-forming composition contains at least one of a hydrolysate of a specific organosilyl compound and a partial condensation product of the hydrolysate, and the centerline surface roughness (Ra) of the outermost face of the antireflective film falls within a specific range.

Now, the low refractive index layer will be described first followed by the description of other layers and the substrate.

<Antireflective Film>

[Low Refractive Index Layer]

The low refractive index layer-forming composition constituting the antireflective layer of the antireflective film according to the invention contains at least one of a hydrolysate of a specific organosilyl compound and a partial condensation product of the hydrolysate.

[Organosilyl Compound]

The specific organosilyl compound to be used in the low refractive index layer-forming composition in the invention is a compound represented by the following formula (1).

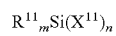 Formula (1):

wherein $X^{11}$ represents —OH, a halogen atom, an —OR$^{12}$ group or an —OCOR$^{12}$ group (wherein R$^{12}$ represents an alkyl group); R$^{11}$ represents an alkyl group, an alkenyl group or an aryl group; and m and n are each a positive integer provided that m+n is 4.

More specifically speaking, R$^{11}$ represents a substituted or unsubstituted alkyl group having from 1 to 10 carbon atoms (for example, methyl, ethyl, propyl, i-propyl, butyl, hexyl or octyl), a substituted or unsubstituted alkenyl group having from 2 to 10 carbon atoms (for example, vinyl, allyl or 2-buten-1-yl) or a substituted or unsubstituted aryl group having from 6 to 10 carbon atoms (for example, phenyl or naphthyl), and R$^{12}$ represents an alkyl group having the same meaning as in R$^{11}$. In the case where the group represented by R$^{11}$ or R$^{12}$ has a substituent, preferable examples of the substituent include halogen atoms (for example, fluorine, chlorine and bromine atoms), hydroxyl group, mercapto group, carboxyl group, epoxy group, alkyl groups (for example, methyl, ethyl, i-propyl, propyl and t-butyl groups), aryl groups (for example, phenyl and naphthyl groups), aromatic heterocyclic groups (for example, furyl, pyrazolyl and pyridyl groups), alkoxy groups (for example, methoxy, ethoxy, i-propoxy and hexyloxy groups), aryloxy groups (for example, phenoxy group), alkylthio groups (for example, methylthio and ethylthio groups), arylthio groups (for example, phenylthio group), alkenyl groups (for example, vinyl and allyl groups), acyloxy groups (for example, acetoxy, acryloyloxy and methacryloyloxy groups), alkoxycarbonyl groups (for example, methoxycarbonyl and ethoxycarbonyl groups), aryloxycarbonyl groups (for example, phenoxycarbonyl group), carbamoyl groups (for example, carbamoyl, N-methylcarbamoyl, N,N-dimethylcarbamoyl and N-methyl-N-octylcarbamoyl group), and acylamino groups (for example, acetylamino, benzoylamino, acrylamino and methacrylamino groups).

The compound of the above formula (1) is hydrolyzed and condensed together to form a matrix by a so-called sol-gel method. The compound of the formula (1) involves compounds represented by the following four formulae.

$Si(X^{11})_4$           Formula (1a):

$R^{11}Si(X^{11})_3$          Formula (1b):

$R^{11}{}_2Si(X^{11})_2$          Formula (1c):

$R^{11}{}_3SiX^{11}$          Formula (1d):

First, the component of the formula (1a) will be described in detail.

Specific examples of the compound represented by the formula (1a) include tetramethoxysilane, tetraethoxysilane, tetra-i-propoxysilane, tetra-n-propoxysilane, tetra-n-butoxysilane, tetra-s-butoxysilane, and tetra-t-butoxysilane. In particular, tetramethoxysilane or tetraethoxysilane is preferable.

Next, the component of the formula (1b) will be described in detail. In the component of the formula (1b), $R^{11}$ represents a group having the same meaning as $R^{11}$ in the formula (1) and examples thereof include alkyl groups such as methyl, ethyl, n-propyl and i-propyl groups, γ-chloropropyl group, vinyl group, $CF_3CH_2CH_2CH_2$—, $C_2F_5CH_2CH_2CH_2$—, $C_3F_7CH_2CH_2CH_2$—, $C_2F_5CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, 3-(perfluorocyclohexyloxy)propyl group, $H(CF_2)_4CH_2OCH_2CH_2CH_2$—, $H(CF_2)_4CH_2CH_2CH_2$—, 3-glycidoxypropyl group, 3-acryloxypropyl group, 3-methacryloxypropyl group, 3-mercaptopropyl group, phenyl group and 3,4-epoxycyclohexylethyl group.

$X^{11}$ represents —OH, a halogen atom, an —$OR^{12}$ group or an —$OCOR^{12}$ group. $R^{12}$ represents a group having the same meaning as $R^{12}$ in the formula (1). It preferably represents an alkoxy group having from 1 to 5 carbon atoms or an acyloxy group having from 1 to 4 carbon atoms and examples thereof include a chlorine atom, methoxy group, ethoxy group, n-propyloxy group, i-propyloxy group, n-butyloxy group, s-butyloxy group, t-butyloxy group and acetyloxy group.

Specific examples of the component of the formula (1b) include methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-acryloxypropyltrimethoxysilane, 3-acryloxypropyltriethoxysilane, 3-methacryloxypropyltrimethoxysilane, 3-methacryloxypropyltriethoxysilane, 3-mercaptopropyltrimethoxysilane, 3-mercaptopropyltriethoxysilane, phenyltrimethoxysilane, phenyltriethoxysilane, 3,4-epoxycyclohexylethyltrimethoxysilane, 3,4-epoxycyclohexylethyltriethoxysilane, $CF_3CH_2CH_2CH_2Si(OCH_3)_3$—, $C_2F_5CH_2CH_2CH_2Si(OCH_3)_3$—, $C_2F_5CH_2CH_2Si(OCH_3)_3$—, $C_3F_7CH_2CH_2CH_2Si(OCH_3)_3$—, $C_2F_5OCH_2CH_2CH_2Si(OCH_3)_3$—, $C_3F_7OCH_2CH_2CH_2Si(OC_2H_5)_3$—, $(CF_3)_2CHOCH_2CH_2CH_2Si(OCH_3)_3$—, $C_4F_9CH_2OCH_2CH_2CH_2Si(OCH_3)_3$—, $H(CF_2)_4CH_2OCH_2CH_2CH_2Si(OCH_3)_3$—, and 3-(perfluorocyclohexyloxy)propylsilane group.

Among them, an organosilyl compound having a fluorine atom is preferred. In the case of using an organosilyl compound having no fluorine atom as $R^{11}$, it is preferable to use methyltrimethoxysilane or methyltriethoxysilane. Either one of the above-described organosilyl compounds or a mixture of two or more thereof can be used.

Next, the component of the formula (1c) will be described in detail. The component of the formula (1c) is an organosilyl compound represented by the formula $R^{11}{}_2Si(X^{11})_2$ (wherein $R^{11}$ and $X^{11}$ have the same meanings as $R^{11}$ and $X^{11}$ defined in the organosilyl compound to be used as the component of the formula (1b) as described above), provided that a plural number of $R^{11}$s are not necessarily the same each other. In the composition according to the invention, this component is hydrolyzed and condensed to give a hydrolysate and/or a partly condensed product, thereby serving as a binder in the composition, softening the coating and improving its alkali resistance.

Specific examples of such organosilyl compounds include dimethyldimethoxysilane, dimethyldiethoxysilane, diethyldimethoxysilane, diethyldiethoxysilane, di-n-propyldimethoxysilane, di-n-propyldiethoxysilane, di-1-propyldimethoxysilane, di-1-propyldiethoxysilane, diphenyldimethoxysilane, diphenyldiethoxysilane, 3,4-epoxycyclohexylethyldimethoxysilane, 3,4-epoxycyclohexylethyldiethoxysilane, $(CF_3CH_2CH_2CH_2)_2Si(OCH_3)_2$—, $(CF_3CH_2CH_2CH_2)_2Si(OCH_3)_2$—, $(C_3F_7CH_2CH_2CH_2)_2Si(OCH_3)_2$—, $[H(CF_2)_6CH_2OCH_2CH_2CH_2]_2Si(OCH_3)_2$—, and $(C_2F_5OCH_2CH_2)_2Si(OCH_3)_2$—. An organosilyl compound having a fluorine atom is preferred. In the case of using an organosilyl compound having no fluorine atom as $R^{11}$, it is preferable to use dimethyldimethoxysilane or dimethyldiethoxysilane. As the organosilyl compound represented by the component of the formula (1c), either one of these compounds or a mixture of two or more thereof can be used.

Next, the component of the formula (1d) will be described in detail. The component of the formula (1d) is an organosilyl compound represented by the formula $R^{11}{}_3SiX^{11}$ (wherein $R^{11}$ and $X^{11}$ have the same meanings as $R^{11}$ and $X^{11}$ defined in the organosilyl compound to be used as the component of the formula (1b) as described above), provided that a plural number of $R^{11}$s are not necessarily the same each other. In the composition according to the invention, this component makes the layer hydrophobic and contributes to the improvement in the alkali resistance of the coating.

Specific examples of such organosilyl compounds include trimethylmethoxysilane, trimethylethoxysilane, triethylmethoxysilane, triethylethoxysilane, tri-n-propylmethoxysilane, tri-n-propylethoxysilane, tri-1-propylmethoxysilane, tri-1-propylethoxysilane, triphenylmethoxysilane, and triphenylethoxysilane.

In the invention, the components of the formulae (1a) to (1d) may be each employed alone. Alternatively, use may be made of a mixture thereof. In the case of using such a mixture, the compositional ratio thereof is as follows. Per 100 parts by weight of the component (1a), namely, the content of the component (1b) is from 0 to 100 parts by weight, preferably from 1 to 60 parts by weight and still preferably from 1 to 40 parts by weight. Per 100 parts by weight of the component (1a), the content of the component (1c) is preferably from 0 to 10 parts by weight, still preferably from 0.1 to 5 parts by weight and still preferably from 0.5 to 3 parts by weight. Per 100 parts by weight of the component (1a), the content of the component (1d) is preferably from 0 to 10 parts by weight, still preferably from 0.1 to 5 parts by weight and still preferably from 0.5 to 3 parts by weight. In the components (1a) to (1d), it is preferable that the content of the component (1a) is 30% by weight or more in 100% by weight of the total organosilyl compounds. It is preferable that the content of the component (1a) is 30% by weight or more, since the thus obtained coating is free from troubles such as worsening in the contact or hardening properties.

[Polymerizable Monomer]

In the invention, it is preferable to use a polymerizable monomer in addition to the organosilyl compound as described above. It is particularly preferable to use a monomer containing a fluorine atom (hereinafter sometimes referred to as a fluorine-containing monomer) from the viewpoint of controlling the refractive index of the obtained low refractive index layer coating to a low level. Although the fluorine-containing monomer is not particularly restricted so long as the monomer contains a fluorine atom, a monomer having a fluorine atom as a perfluoroalkyl group is particularly preferable from the viewpoint of fluorine content.

Specific examples of the polymerizable monomer include partly or completely fluorinated alkyl, alkenyl and aryl esters of acrylic acid and methacrylic acid, partly or completely fluorinated vinyl ethers, partly or completely fluorinated vinyl esters and partly or completely fluorinated vinyl ketones. It is preferable to control the content of the polymerizable monomer to from 1 to 50% by weight based on the total solid contents in the low refractive index layer.

[Inorganic Fine Particles]

It is also preferable to use inorganic fine particles in the low refractive index layer.

The coating amount of the inorganic fine particles is preferably from 1 to 100 mg/m$^2$, still preferably from 5 to 80 mg/m$^2$ and still preferably from 10 to 60 mg/m$^2$. It is desirable that the inorganic fine particles are used in an amount not smaller than the lower limit, since no trouble such as worsening in the effect of improving scratch resistance would arise in this case. It is desirable that the amount of the inorganic fine particles is not more than the upper limit, since fine irregularities are achieved on the surface of the low refractive index layer to thereby prevent troubles, for example, as worsening in appearance such as definitiveness in black color and lowering integral reflection ratio. Because of being contained in the low refractive index layer, the inorganic fine particles preferably have a low refractive index. Examples thereof include fine particles of magnesium fluoride and silica. From the viewpoints of refractive index, dispersion stability and cost, fine silica particles are preferred.

(Fine Silica Particles)

The average particle size of the fine silica particles corresponds to 30% or more but not more than 150% of the thickness of the low refractive index layer, preferably 35% or more but not more than 80% and still preferably 40% or more but not more than 60%. In the case where the thickness of the low refractive index layer is 100 nm, that is, the particle size of the fine silica particles is preferably 30 nm or more but not more than 150 nm, still preferably 35 nm or more but not more than 80 nm and still preferably 40 nm or more but not more than 60 nm.

In the case where the particle size of the fine silica particles is too small, the effect of improving scratch resistance is sometimes worsened. In the case where the particle size thereof is too large, fine irregularities are formed on the surface of the low refractive index layer and there sometimes arise worsening in appearance such as definitiveness in black color and lowering in integral reflection ratio. It is therefore favorable to employ fine silica particles having such a particle size within the range as defined above. The fine silica particles may be either crystalline particles or amorphous ones. Also, use may be made of either singly dispersed particles or aggregated particles so long as having a particle size satisfying the requirement as defined above. Concerning the shape, spherical particles are most desirable but those having an undefined shape may be also usable without any problem. The average particle size of the inorganic fine particles is measured with a Coulter's counter.

To further regulate an increase in the refractive index of the low refractive index layer, it is preferable to use fine silica particles having a hollow structure (hereinafter sometimes referred to as hollow particles). The refractive index of these hollow particles is preferably from 1.17 to 1.40, still preferably from 1.17 to 1.35 and still preferably from 1.17 to 1.30. The refractive index as used herein means not the refractive index of the silica, i.e., the shell forming the hollow particles, but the refractive index of the particles as a whole. When the radius of the inner cavity in a particle is referred to as $r_i$ and the radius of the outer shell of the particle is referred to as $r_o$, the porosity x is represented by the following numerical formula (1).

$$x = (r_i/r_o)^3 \times 100(\%) \qquad \text{Numerical formula (1):}$$

The porosity of the hollow particles as described above is preferably from 10 to 60%, still preferably from 20 to 60% and most desirably from 30 to 60%. In the case of attempting to achieve a refractive index of the hollow particles lower than the level as defined above and a porosity thereof higher than the level as defined above, the thickness of the shell is reduced. From the viewpoints of the strength of the hollow particles and the scratch resistance of the low refractive index layer, therefore, it is favorable that the refractive index of the hollow particles is 1.17 or more.

The refractive index of these hollow particles is measured with an Abbe refractometer (manufactured by ATAGO).

It is preferable that the low refractive index layer further contains at least one type of fine silica particles having an average particle size corresponding to less than 25% of the thickness of the low refractive index layer (hereinafter sometimes referred to as fine particles of smaller size) together with the fine silica particles having a preferable average particle size falling within the range as specified above (hereinafter sometimes referred to as fine particles of larger size).

The fine silica particles may be subjected to a physical surface treatment such as plasma discharge treatment or corona discharge treatment or a chemical surface treatment with the use of, for example, a surfactant or a coupling agent to thereby stabilize the dispersion thereof in a liquid dispersion or a composition for forming low refractive index layer or to improve the affinity and binding properties thereof to a matrix component. It is particularly preferable to employ a coupling agent therefor. As the coupling agent, it is preferable to use an alkoxymetal compound (for example, a titanium coupling agent or a silane coupling agent). Among all, a treatment with a silane coupling agent is particularly advantageous.

The coupling agent is employed as a surface-treating agent by which the inorganic fine particles in the low refractive index layer are preliminarily surface-treated before the preparation of the composition for forming low refractive index layer. It is preferable that the coupling agent is further added as an additive in preparing the composition for forming low refractive index layer so that the low refractive index layer contains the coupling agent. To lessen the load during the surface-treatment, it is preferable that the fine silica particles are preliminarily dispersed in a medium before the surface-treatment.

The discussions on the fine silica particles as presented above are also applicable to other inorganic particles. Namely, it is preferable that the low refractive index layer contains inorganic fine particles having an average particle size corresponding to 30% or more but not more than 120% of the thickness of the low refractive index layer, having a hollow structure and having a refractive index of from 1.17 to 1.40. As examples of particles preferably usable in the invention, particles produced in accordance with techniques reported in JP-A-2001-233611, JP-A-2002-79616 and so on may be cited.

It is favorable that the inorganic fine particles preferably usable in the low refractive index layer in the invention are preliminarily dispersed. As the dispersion medium, use may be preferably made of a liquid having a boiling point of from 60 to 170° C. Examples of the dispersion medium include water, alcohols (for example, methanol, ethanol, isopropanol, butanol and benzyl alcohol), ketones (for example, acetone, methyl ethyl ketone, methyl isobutyl ketone and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexane), halogenated hydrocarbons (for example, methylene chloride, chloroform and carbon tetrachloride), aromatic hydrocarbons (for example, benzene, toluene and xylene), amides (for example, dimethylformamide, dimethylacetamide and n-methylpyrrolidone), ethers (for example, diethyl ether, dioxane and tetrahydrofuran), and ether alcohols (for example, 1-methoxy-2-propanol). Among all, water, methanol, ethanol and isopropyl alcohol are preferred.

It is preferable that the concentration of the inorganic fine particles in the inorganic fine particle dispersion is controlled to 3 to 300 g/L.

[Catalyst]

In the composition for forming low refractive index layer according to the invention, use can be preferably made of various catalytic compounds in order to promote the hydrolysis/partial condensation reaction of the organosilyl compound represented by the above formula (1). The catalyst to be used is not particularly restricted but may be used in an appropriate amount depending on the constituents of the sol solution employed. In general, the following compounds (c1) to (c5) are effective as the catalyst. A preferable compound can be selected from them and added in a required amount. Alternatively, it is also possible to select two or more compounds from them and used together, so long as the promoting effects thereof are not inhibited by each other.

(c1) Organic or Inorganic Acid

Examples of an organic or inorganic acid include hydrochloric acid, hydrogen bromide, hydrogen iodide, sulfuric acid, sulfurous acid, nitric acid, nitrous acid, phosphoric acid, phosphorous acid, heteropoly acids (for example, phosphomolybdic acid and phosphotungstic acid). Examples of an organic acid include carboxylic acids (for example, formic acid, oxalic acid, acetic acid, propionic acid, butyric acid, succinic acid, cyclohexanecarboxylic acid, octanoic acid, maleic acid, 2-chloropropionic acid, cyanoacetic acid, trifluoroacetic acid, perfluorooctanoic acid, benzoic acid, pentafluorobenzoic acid and phthalic acid), sulfonic acids (for example, methanesulfonic acid, ethanesulfonic acid, trifluoromethanesulfonic acid, p-toluenesulfonic acid an dpentabenzenesulfonic acid), sulfonic acids esterified in phosphate moiety (for example, phosphoric acid dimethyl ester, phenylphosphonic acid) and Lewis acids (for example, boron trifluoride etherate, scandium triflate, alkyltitanic acids and aluminic acid).

(c2) Organic or Inorganic Base

Examples of an inorganic base include sodium hydroxide, potassium hydroxide, calcium hydroxide, magnesium hydroxide, aluminum hydroxide and ammonia. Examples of an organic base include amines (for example, ethylenediamine, diethylenetriamine, triethylenetetramine, tetraethylenepentamine, triethylamine, dibutylamine, tetramethylethylenediamine, piperidine, piperazine, morpholine, ethanolamine, diazabicycloundecene, quinuclidine, aniline and pyridine), phosphines (for example, triphenylphosphine and trimethylphosphine), and metal alkoxides (for example, sodium methylate and potassium ethylate).

(c3) Metal Chelate Compound

A metal chelate compound having an alcohol represented by the formula $R^{O1}OH$ (wherein $R^{O1}$ represents an alkyl group having from 1 to 6 carbon atoms) and a diketone represented by the formula $R^{O2}COCH_2COR^{O3}$ (wherein $R^{O2}$ represents an alkyl group having from 1 to 6 carbon atoms, and $R^{O3}$ represents an alkyl group having from 1 to 5 carbon atoms or an alkoxy group having from 1 to 16 carbon atoms) as a ligand and carrying a metal as the central metal atom can be appropriately employed without specific restriction. Two or more metal chelate compounds may be used together within the above range. As the metal chelate compound to be use in the invention, those having Al, Ti or Zr as the central metal atom are particularly preferable. Namely, a metal chelate compound selected from those represented by the following formulae are preferred and it has an effect of promoting the condensation reaction of the components (1a) to (1d) as described above:

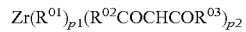

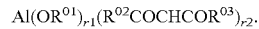

In the metal chelate compound, $R^{O1}$ and $R^{O2}$ may be either the same or different and each represents an alkyl group having from 1 to 6 carbon atoms, more specifically, an ethyl group, an n-propyl group, an i-propyl group, an n-butyl group, an s-butyl group, a t-butyl group, an n-pentyl group, a phenyl group or the like. $R^{O3}$ represents an alkyl group having from 1 to 6 being the same carbon atoms as $R^{O1}$ and $R^{O2}$ or an alkoxy group having from 1 to 16 carbon atoms, for example, a methoxy group, an ethoxy group, an n-propoxy group, an i-propoxy group, an n-butoxy group, an s-butoxy group, a t-butoxy group, a lauryl group or a stearyl group. In the metal chelate compound, p1, p2, q1, q2, r1 and r2 represent each an integer determined so as to give tetra- or hexa-dentate coordination.

Specific examples of these metal chelate compounds include zirconium chelate compounds such as tri-n-butoxyethylacetoacetate zirconium, di-n-butoxybis(ethylacetoacetate) zirconium, n-butoxytris(ethylacetoacetate) zirconium, tetrakis(n-propylacetoacetate) zirconium, tetrakis(acetylacetoacetate) zirconium and tetrakis(ethylacetoacetate) zirconium; titanium chelate compounds such as diisopropoxy bis(ethylacetoacetate) titanium, diisopropoxy bis(acetylacetate) titanium and diisopropoxy bis(acetylacetone) titanium; and aluminum chelate compounds such as diisopropoxyethylacetoacetate aluminum, diisopropoxyacetylacetonate aluminum, isopropoxybis(ethylacetoacetate) aluminum, isopropoxybis(acetylacetonate) aluminum, tris(ethylacetoacetate) aluminum, tris(acetylacetonate) aluminum, and monoacetylacetonate bis(ethylacetoacetate) aluminum. Among these metal chelate compounds, tri-n-butoxyethylacetoacetate zirconium, diisopropoxy bis(acetylacetonate) titanium, diisopropyloxyethylacetoacetate aluminum and tris(ethylacetoacetate) aluminum are preferable. One of these metal chelate compounds may be used alone. Alternatively, a mixture of two or more thereof may be used. Also, use can be made of a partly hydrolyzed product of such a metal chelate compound.

(C4) Organometal Compound

Although preferred organometal compounds are not particularly restricted, it is advantageous to employ organic transition metals having a high activity. Among all, tin compounds are particularly preferable because of being excellent in stability and activity. Specific examples of such compounds include organotin compounds of carboxylic acid type such as $(C_4H_9)_2Sn(ORGANOSILYL\ COMPOUND_{11}H_{23})_2$, $(C_4H_9)_2Sn(ORGANOSILYL\ COMPOUNDH=CHCOOCH_3)_2$, $(C_4H_9)_2Sn(ORGANOSILYL\ COMPOUNDH=CHCOOC_4H_9)_2$, $(C_8H_{17})_2Sn(ORGANOSILYL\ COMPOUND_{11}H_{23})_2$, $(C_8H_{17})_2Sn(ORGANOSILYL\ COMPOUNDH=CHCOOCH_3)_2$, $(C_8H_{17})_2Sn(ORGANOSILYL\ COMPOUNDH=CHCOOC_4H_9)_2$ and $(C_8H_{17})_2Sn(ORGANOSILYL\ COMPOUNDH=CHCOOC_8H_{17})_2$; organotin compounds of mercaptide type such as $(C_4H_9)_2Sn(SCH_2COOC_8H_{17})_2$, $(C_8H_{17})_2Sn(SCH_2COOC_8H_{17})_2$, $(C_8H_{17})_2Sn(SCH_2CH_2COOC_8H_{17})_2$, $(C_8H_{17})_2Sn(SCH_2COOC_8H_7)_2$ and $(C_8H_{17})_2Sn(SCH_2COOC_{12}H_{25})_2$; or a product obtained by reacting an organotin oxide such as $(C_4H_9)_2SnO$ or $(C_8H_{17})_2SnO$ with an ester compound such as ethyl silicate, dimethyl maleate, diethyl maleate or dioctyl phthalate.

(C5) Metal Salt

As a metal salt, it is preferable to use an alkali metal salt of an organic acid (for example, sodium naphthenate, potassium naphthenate, sodium octanoate, sodium 2-ethylhexanoate or potassium laurate).

The content of such a catalyst in the composition for forming low refractive index layer is preferably from 0.01 to 50 parts by weight, still preferably from 0.1 to 50 parts by weight and still preferably from 0.5 to 10 parts by weight per 100 parts by weight of the organosilyl compound.

[Chelate Coordination Compound]

In the case of using the above-described metal chelate compound as a catalyst, it is also preferable, from the viewpoints of controlling the hardening reaction speed and improving solution stability, to employ a compound having a chelating ability. Examples of the chelate compound preferably usable herein include β-diketones and/or β-ketoesters represented by the formula $R^{O1}COCH_2COR^{O2}$ that contribute to the improvement in the stability of the composition for forming low refractive index layer. Namely, it is considered that coordination to the metal atom in the metal chelate compound (preferably a zirconium, titanium and/or aluminum compound) in the composition for forming low refractive index layer would regulate the effect of the metal chelate compound of promoting the condensation reaction of the components (1a) to (1d), thereby controlling the hardening speed of the resulting layer. Although $R^{O1}$ and $R^{O2}$ have the same meaning as $R^{O1}$ and $R^{O2}$ constituting the metal chelate compound as described above, they do not necessarily have the same structure in using.

Specific examples of these β-diketones and/or β-ketoesters include acetylacetone, methyl acetoacetate, ethyl acetoacetate, n-propyl acetoacetate, i-propyl acetoacetate, n-butyl acetoacetate, s-butyl acetoacetate, t-butyl acetoacetate, 2,4-hexandione, 2,4-heptandione, 3,5-heptandione, 2,4-octandione, 2,4-nonandione, and 5-methylhexan-dione. Among these compounds, ethyl acetoacetate and acetylacetone are preferable and acetylacetone is particularly preferred. Either one of these β-diketones and/or β-ketoesters or a mixture of two or more thereof may be used. Such β-diketones and/or β-ketoesters are used in an amount of 2 mol or more, preferably from 3 to 20 mol per mol of the metal chelate compound. By using 2 mol or more thereof, the storage stability of the composition can be improved.

[Preparation of Composition for Forming Low Refractive Index Layer]

The composition for forming low refractive index layer, which is employed in order to forming the low refractive index layer, is a liquid composition usable in coating.

Namely, the composition for forming low refractive index layer to be used in the invention may contain at least one of a hydrolysate of the organosilyl compound as described above and a partial condensation product of the hydrolysate and a solvent together with, if needed, the polymerizable monomer as discussed above, the inorganic fine particles as discussed above and a fluorine-containing compound or polysiloxane as will be discussed hereinafter.

Examples of the solvent usable herein include alcohols (for example, methanol, ethanol, isopropyl alcohol, butanol and 2-butanol) and ketones (for example, acetone, methyl ethyl ketone, methyl isobutyl ketone and cyclohexanone).

It is preferable in the invention that the composition for forming low refractive index layer further contains water for the hydrolysis/condensation reaction of the organosilyl compound, i.e., the component of one of the formulae (1a) to (1d). The amount of the water to be used herein is usually from about 1.2 to 3.0 mol and preferably from about 1.3 to 2.0 mol, per mol of the component of one of the formulae (1a) to (1d).

The total solid concentration of the composition for forming low refractive index layer is preferably from 0.1 to 50% by weight and still preferably from 1 to 40% by weight. It is favorable that the total solid concentration is 50% by weight or less, since there arises no problem such as worsening in the storage stability of the composition in this case.

To prepare the composition for forming low refractive index layer, it is preferred that the organosilyl compound is first reacted in the presence of water and the catalyst and then partly hydrolyzed followed by polycondensation. The relative molecular weight of the siloxane oligomer in terms of ethylene glycol/polyethylene oxide is preferably from 700 to 1500 and still preferably from 900 to 1000. The reaction temperature is preferably from 5 to 50° C., still preferably form 10 to 40° C. and most desirably from 15 to 30° C.

[Layer Thickness of Low Refractive Index Layer]

In the invention, the layer thickness of the low refractive index layer is preferably from 50 to 200 nm, still preferably from 60 to 150 nm and most desirably from 70 to 120 nm. When the layer thickness does not exceed the upper limit as defined above, an excellent strength can be achieved without causing any trouble such as an increase in brittleness. When the layer thickness is not less than the lower limit as defined above, there arises no trouble such as worsening in the layer strength. Therefore, it is preferred to control the layer thickness of the low refractive index layer within the range as defined above.

[Surface Free Energy]

From the viewpoint of improving antifouling properties, it is preferred in the invention to lower the surface free energy of the antireflective film surface. This object can be achieved in practice by providing a compound for lowering surface free energy, for example, a fluorine-containing compound or a compound having a polysiloxane structure, on the outermost face. The surface free energy is preferably 26 mJ/m$^2$ or less, still preferably 24 mJ/m$^2$ or less and most desirably 22 mJ/m$^2$ or less.

As preferable examples of the fluorine-containing compound, fluorine atom-containing compounds among the organosilyl compounds of the formula (1) may be cited.

As the additive having a polysiloxane structure, it is preferable to add polysiloxane having reactive group, for example, "KF-100T", "X-22-169AS", "KF-102", "X-22-

37011E", "X-22-164B", "X-22-5002", "X-22-173B", "X-22-174D", "X-22-1667B" and "X-22-161AS" {each manufactured by SHIN-ETSU CHEMICAL Co., Ltd.}, "AK-5", "AK-30" and "AK-32" {each manufactured by TOAGOSEI Co., Ltd.} "SILAPLANE FM0725" and "SILAPLANE FM0721" {each manufactured by CHISSO CORPORATION}. Moreover, use may be preferably made of silicone compounds listed in TABLES 2 and 3 in JP-A-2003-112383.

In the case where the low refractive index layer is the outermost layer of the antireflective film according to the invention, such a compound for lowering surface free energy is preferably added in an amount of from 0.1 to 10% by weight, still preferably from 1 to 5% by weight, based on the total solid matters in the composition for forming low refractive index layer.

[Antifouling Layer]

In the case where the low refractive index layer is the outermost layer, the compound for lowering surface free energy may be preliminarily mixed and condensed with the organosilyl compound as described above. Alternatively, the condensation may be performed in the step of drying and hardening. It is also possible that, after forming the low refractive index layer, a composition containing the compound for lowering surface free energy is applied thereon to form an antifouling layer, thereby controlling the surface free energy within the preferred range as defined above.

In the case of forming an antifouling layer, use can be preferably made of a perfluoropolyether group-containing silane coupling agent represented by the following formula (2).

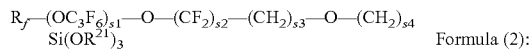

Formula (2):

In the above formula (2), $R_f$ represents a linear or branched perfluoroalkyl group having from 1 to 16 carbon atoms and $CF_3$—, $C_2F_5$— or $C_3F_7$— is particularly preferable. $R^{21}$ represents a linear or branched alkyl group having from 1 to 5 carbon atoms and —$CH_3$ or —$C_2H_5$ is particularly preferable. s1 is an integer of from 1 to 50, se is an integer of from 0 to 3, s3 is an integer of from 0 to 3 and s4 is an integer of from 0 to 6, provided that $6 \geq s2+s3>0$.

Any coating method may be employed so long as uniform coating may be carried out thereby. For example, use can be made of various publicly known methods such as wet coating methods (for example, dip coating method, spin coating method, flow coating method, spray coating method, roll coating method, gravure coating method, air doctor coating method, blade coating method, wire doctor coating method, knife coating method, reverse coating method, transfer roll coating method, microgravure coating method, kiss coating method, cast coating method, slot orifice coating method, calender coating method and die coating method), physical vapor deposition (PVD) methods such as vacuum deposition method, reactive deposition method, ion beam assist method, sputtering method and ion plating method, and chemical vapor deposition (CVD) methods.

After forming the antifouling layer, it may be subjected, if needed, to heating, moistening, UV-irradiation, electron beam-irradiation, or the like.

Although the layer thickness of the antifouling layer is not particularly restricted, it preferably ranges from 1 to 50 nm from the viewpoints of antifouling properties, scratch resistance and optical performance of optical members.

[Layer Constitution of Antireflective Film]

The antireflective film according to the invention comprises the transparent substrate and the low refractive index layer as the essentially required layers optionally together with a hard coat layer as will be described hereinafter and various layers, while considering the refractive index, layer thickness, layer number and layering order so as to lower the reflectivity due to optical interference. The antireflective film of the simplest constitution comprises a low refractive index layer alone formed on the transparent substrate. To further lower the reflectivity, it is preferable that the antireflective film has a combination of a high refractive index layer having a refractive index higher than that of the transparent substrate with a low refractive index layer having a refractive index lower than that of the transparent substrate. Constitutional examples include a two-layered film having a high refractive index layer and a low refractive index layer from the transparent substrate side, and a film having three layers differing in refractive index layered in the order of a medium refractive index layer (a layer having a refractive index which is higher than that of the transparent substrate or the hard coat layer but lower than that of the high refractive index layer)/a high refractive index layer/a low refractive index layer. Moreover, there have been proposed antireflective films having a larger number of layers laminated together. Among all, an antireflective film in which a hard coat layer is formed on a transparent substrate and a medium refractive index layer/a high refractive index layer/a low refractive index layer are layered thereon in this order is preferable from the viewpoints of durability, optical characteristics, cost and productivity.

Preferable layer constitutions of the antireflective film according to the invention are as follows. In these examples, the cases of forming an antifouling layer are omitted:

transparent substrate/low refractive index layer;

transparent substrate/antiglare layer/low refractive index layer;

transparent substrate/antiglare layer/antistatic layer/low refractive index layer;

transparent substrate/antistatic layer/antiglare layer/low refractive index layer;

transparent substrate/hard coat layer/antistatic layer/low refractive index layer;

transparent substrate/antistatic layer/hard coat layer/low refractive index layer;

transparent substrate/hard coat layer/high refractive index layer/low refractive index layer;

transparent substrate/hard coat layer/medium refractive index layer/high refractive index layer/low refractive index layer;

transparent substrate/antiglare layer/high refractive index layer/low refractive index layer;

transparent substrate/antiglare layer/medium refractive index layer/high refractive index layer/low refractive index layer;

transparent substrate/antistatic layer/hard coat layer/medium refractive index layer/high refractive index layer/low refractive index layer;

antistatic layer/transparent substrate/hard coat layer/medium refractive index layer/high refractive index layer/low refractive index layer;

transparent substrate/antistatic layer/antiglare layer/medium refractive index layer/high refractive index layer/low refractive index layer;

antistatic layer/transparent substrate/antiglare layer/medium refractive index layer/high refractive index layer/low refractive index layer; and antistatic layer/transparent substrate/antiglare layer/high refractive index layer/low refractive index layer/high refractive index layer/low refractive index layer.

From the viewpoint of lowering reflectivity, use may be preferably made of an antireflective layer comprising a constitution such as medium refractive index layer/high refractive index layer/low refractive index layer as described in, for example, JP-A-2003-262702.

The layer constitution of the antireflective film according to the invention is not particularly restricted to these constitutions, so long as the reflectivity can be lowered thereby due to optical interference.

The antistatic layer is preferably a layer containing electrically conductive polymer particles or fine particles of a metal oxide (for example, $SnO_2$ or ITO). It can be formed by, for example, coating or atmospheric plasma treatment.

Next, the individual layers and transparent substrate usable in the invention will be illustrated.

[Hard Coat Layer]

Next, the hard coat layer to be used in the invention will be illustrated.

The hard coat layer can be formed by arbitrarily combining constituents selected from among a binder, matting particles for imparting antiglare properties or internal scattering properties and an inorganic filler for controlling refractive index, preventing crosslinking shrinkage or enhancing the strength.

It is preferable in the invention to employ a hard coat layer also serving as a light-diffusion layer that contains a light-transmitting resin as the binder and light-transmitting particles as the matting particles. That is to say, the term "hard coat layer" as used in the invention is not a hard coat layer in a narrow meaning (i.e., a layer having a function of elevating the layer hardness) but a layer capable of exhibiting functions achieved by appropriately combining the above-described constituents. Accordingly, it may serve as a hard coat layer in the narrow meaning, a high refractive index layer, a medium refractive index layer, an antiglare layer, a light-diffusion layer, an inner scattering layer or an antistatic layer depending on the combination of the constituents.

[Binder]

As the light-transmitting resin as describe above to be used as a binder in the hard coat layer, it is preferable to use a binder polymer having a saturated hydrocarbon chain or a polyether chain as the main chain and a polymer having a saturated hydrocarbon chain is still preferable. It is also preferable that the binder polymer has a crosslinked structure.

As the binder polymer having a saturated hydrocarbon chain as the main chain, a polymer of an ethylenically unsaturated monomer is preferred. As the binder polymer having a saturated hydrocarbon chain as the main chain and a crosslinked structure, a (co)polymer of monomer(s) having two or more ethylenically unsaturated bonds is preferable. To achieve a high refractive index, it is possible to select a monomer having an aromatic ring or at least one atom selected from among halogen atoms other than fluorine, sulfur atom, phosphorus atom and nitrogen atom in its structure.

Examples of the monomer having two or more ethylenically unsaturated bonds include esters of polyhydric alcohol with (meth)acrylic acid (for example, ethylene glycol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate), divinyl benzene and its derivatives (for example, 1,4-divinyl benzene, 4-vinylbenzoic acid-2-acryloylethyl ester and 1,4-divinyl cyclohexanone), vinyl sulfones (for example, divinyl sulfone), and acrylamide derivatives (for example, methylenebis(meth)acrylamide). Two or more of these monomers may be used together.

Specific examples of the monomer having high refractive index include bis(4-methacryloylthiophenyl) sulfide, vinyl naphthalene, vinyl phenyl sulfide and 4-methacryloyloxyphenyl-4'-methoxyphenyl thioether. It is also possible to use two or more of these monomers together.

Such a monomer having ethylenically unsaturated bonds can be polymerized by ionizing radiation or heating in the presence of a photo radical polymerization initiator or a heat radical polymerization initiator. That is to say, a coating solution of a composition for forming hard coat layer, which contains the monomer having ethylenically unsaturated bonds, a photo radical polymerization initiator or a heat radical polymerization initiator, light-transmitting particles and an inorganic filler, is prepared. Then the coating solution is applied to a face on which the hard coat layer is to be formed and hardened by polymerization under ionizing radiation or heating. Thus, the hard coat layer can be formed.

As the photo radical polymerization initiator, use can be made of acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds.

Examples of the acetophenones include 2,2-diethoxyacetophenone, p-dimethylacetophenone, 1-hydroxydimetmhyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone.

Examples of the benzoins include benzoin benzenesulfonate, benzoin toluenesulfonate, benzoin methyl ether, benzoin ethyl ether and benzoin isopropyl ether.

Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

Moreover, various examples of photo radical polymerization initiator are presented in *Saishin UV Koka Gijutsu*, (p. 159, publisher: Kazuhiro Takausu, publishing office: GIJUTSU KYOKAI K.K.) and these initiators are useful in the invention. As preferable examples of commercially available photo radical polymerization initiators of photo cleavage type, "IRGACURES (651, 184, 907)" (manufactured by Ciba-Geigy) may be cited.

The photo radical polymerization initiator is used preferably in an amount of from 0.1 to 15 parts by weight, still preferably from 1 to 10 parts by weight, per 100 parts by weight of the total amount of the monomers as described above.

In addition to the photo radical polymerization initiator, it is also possible to use a photo sensitizer. Specific examples of the photo sensitizer include n-butylamine, triethylamine, tri-n-butylphosphine, Micheler's ketone and thioxanthone.

As the heat radical initiator, use can be made of, for example, an organic or inorganic peroxide, an organic azo or diazo-compound.

More specifically speaking, examples of the organic peroxide include benzoyl peroxide, halogenobenzoyl peroxides, lauroyl peroxide, acetyl peroxide, dibutyl peroxide, cumene hydroxyperoxide and butyl hydroxyperoxide; examples of the inorganic peroxide include hydrogen peroxide, ammonium persulfate and potassium persulfate; examples of the azo compound include 2-azobisisobutyronitrile, 2-azobispropionitrile and 2-azobiscyclohexanedinitrile; and examples of the diazo compound include diazoaminobenzene and p-nitrobenzene diazonium.

As the binder polymer having polyether as the main chain, it is preferable to employ a ring-opening polymer of a polyfunctional epoxy compound. The ring-opening polymerization of the polyfunctional epoxy compound can be carried out by ionizing radiation or heating in the presence of a photo acid generator or a heat acid generator. That is to say, a coating solution of the composition for forming hard coat layer, which contains the polyfunctional epoxy compound, a photo acid generator or a heat acid generator, light-transmitting particles and an inorganic filler, is prepared. Then the coating solution is applied to the face on which the hard coat layer is to be formed and then hardened by polymerization under ionizing radiation or heating. Thus, the hard coat layer can be formed.

It is also possible to use a monomer having a crosslinking functional group, as a substitute for the monomer having two or more ethylenically unsaturated bonds or in addition thereto, to thereby introduce the crosslinking functional group into the polymer. Thus, a crosslinked structure can be introduced into the binder polymer owing to the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. As a monomer for introducing a crosslinked structure, use can be also made of vinylsuflonic acid, acid anhydrides, cyanoacrylate derivatives, melamine, etherified methylol, esters and urethane and metal alkoxides such as tetramethoxysilane. It is also possible to use a functional group that shows crosslinking ability as the result of a decomposition reaction, for example, a blocked isocyanate group. Namely, the crosslinking functional group to be used in the invention may be either one showing an immediate reactivity or one showing a reactivity after decomposition.

The binder polymer containing such a crosslinking functional group can form a crosslinked structure by heating after the application.

To improve the durability of the antireflective film, the polarizing plate and the display unit in the invention, it is preferable that the hard coat layer is formed by applying a composition for forming hard coat layer which contains at least one of an organosilyl compound represented by the formula (1), a hydrolysate of the organosilyl compound and a partial condensation product of the hydrolysate, or a polyfunctional isocyanate compound.

In the case of using an organosilyl compound, the content of the organosilyl compound is preferably 0.1% by weight or more but not more than 120% by weight, still preferably 0.5% by weight or more but not more than 60% and most desirably 1.0% by weight or more but not more than 40% by weight, based on the solid matters (the binder, particles and so on), other than the organosilyl compound, contained in the hard coat layer. The organosilyl compound may be added in an unhydrolyzed state to the coating solution of the composition for forming hard coat layer. Alternatively, it may be added in a partly or completely hydrolyzed state. From the viewpoint of improving the durability under storage conditions with wide temperature swings or in an ozone-containing atmosphere, it is favorable to add the organosilyl compound as a condensation product of about 2- to 15-mers to the hard coat layer. The degree of condensation can be calculated by gas permeation chromatography. In the case where the hard coat layer contains an inorganic filler, it is also preferable that the organosilyl compound is employed in the state of hydrogen-bonded and/or covalently bonded to the surface of the inorganic filler. As the inorganic filler, is it preferable to use tin oxide or indium oxide having electrical conductivity as will be described hereinafter.

Preferable examples of the organosilyl compound are as follows, though the invention is not restricted thereto, namely, tetramethoxysilane, tetraethoxysilane, tetra-i-propoxysilane, tetra-n-propoxysilane, methyl trimethoxysilane, ethyl trimethoxysilane, ethyl triethoxysilane, 3-glycidoxypropyl trimethoxysilane, 3-glycidoxypropyl triethoxysilane, 3-acryloxypropyl trimethoxysilane, 3-acryloxypropyl triethoxysilane, 3-methacryloxypropyl trimethoxysilane, 3-methacryloxypropyl triethoxysilane, 3-mercaptopropyl trimethoxysilane and 3,4-epoxycyclohexylethyl triethoxysilane.

Examples of the organosilyl compound preferable as a condensation product include condensation products (5- to 10-mers) of tetraethoxysilane with 3-acryloxypropyl trimethoxysilane at a ratio by weight of 1:9, 2- to 10-mers of 3-acryloxypropyl trimethoxysilane, condensation products (5-to 10-mers) of tetraethoxysilane with 3-methacryloxypropyl trimethoxysilane at a ratio by weight of 1:9, and 2- to 10-mers of 3-glycidoxypropyl triethoxysilane.

As the polyfunctional isocyanate compound usable in the hard coat layer, compounds represented by the following formula (3) are preferable.

$$R^{31}-(NCOO)_m \quad \text{Formula (3):}$$

In the formula (3), $R^{31}$ represents an arbitrary group having a valency m, while m is an integer of 2 or above.

As the compound represented by the above formula (3), use can be made of publicly known compounds which are bifunctional, trifunctional or higher polyfunctional isocyanate compounds. Although $R^{31}$ in the formula (3) is not particularly restricted, it represents a group having a valency m such as an aliphatic group having from 2 to 30 carbon atoms, an aromatic group having from 6 to 30 carbon atoms, a saturated or unsaturated heterocyclic group having from 3 to 40 carbon atoms or a group obtained by combining the same. It is preferable that m is from 2 to 5, still preferably 2 or 3.

The compound represented by the formula (3) can be produced by a method commonly employed. Examples of the compound represented by the formula (3), aromatic isocyanate compounds and aliphatic isocyanate compounds can be cited.

Examples of the bifunctional isocyanate represented by the formula (3) include aromatic bifunctional isocyanates such as 2,4-trilene diisocyanate, 2,6-trilene diisocyanate, m-phenylene diisocyanate, p-phenylene diisocyanate, m-xylylene diisocyanate, p-xylylene diisocyanate, 4-chloroxylylene-1,3-diisocyanate, 2-methylxylylene diisocyanate, 4,4'-diphenylmethane diisocyanate, 4,4'-diphenylpropane diisocyanate, 4,4'-diphenylhexafluoropropane diisocyanate, 1,4-naphthalene diisocyanate, 3,3'-dimethoxybiphenyl diisocyanate and 3,3'-dimethyldiphenylmethane-4,4'-diisocyanate; aliphatic bifunctional isocyanates such as 1,3-trimethylene diisocyanate, propylene-1,2-diisocyanate, butylene-1,2-diisocyanate, 1,6-hexamethylene diisocyanate, cyclohexylene-1,2-diisocyanate, cyclohexylene-1,3-diisocyanate, cyclohexylene-1,4-diisocyanate, isophorone diisocyanate, hydrogenated m-xylylene diisocyanate, hydrogenated p-xylylene diisocyanate, hydrogenated 4,4'-diphenylmethane diisocyanate and 2,5-di(isocyanatomethyl) norbornane; and addition products of these bifunctional isocyanates with bifunctional alcohols or phenols such as ethylene glycol or bisphenol.

Examples of the trifunctional or higher isocyanate represented by the above formula (3) include compounds obtained by starting with the bifunctional isocyanates as cited above, for example, trimers (biuret or isocyanurate), addition products with trifunctional alcohols such as trimethylolpropane, addition products with trifunctional phenols such as phloroglucin, formalin condensation products of benzene isocyanate (for example, polymethylene polyphenylene polyisocyanate), polymers of isocyanate compounds having polymerizable group such as methacryloyloxyethyl isocyanate and lysine triisocyanate.

As particularly preferable examples of the compound represented by the formula (3), at least a compound selected from among 2,4-trilene diisocyanate, 2,6-trilene diisocyanate, m-xylylene diisocyanate, 1,6-hexamethylene diisocyanate, 2,5-di(isocyanatomethyl) norbornane, 4,4'-diphenylmethane diisocyanate, hydrogenated m-xylylene diisocyanate and hydrogenated 4,4'-diphenylmethane diisocyanate and mixtures thereof may be cited.

[Light-Transmitting Particle]

To impart antiglare properties and/or internal scattering properties, the hard coat layer preferably contains light-transmitting particles which are larger than the inorganic filler particles and preferably have an average particle size of from 0.1 to 5.0 μm, still preferably from 1.5 to 3.4 μm, such as particles of an inorganic compound or resin particles. The difference in refractive index between the light-transmitting particles and the light-transmitting resin preferably ranges from 0.02 to 0.20, particularly preferably from 0.04 to 0.10. It is preferable that the refractive index difference is not more than the upper limit as defined above, since there arises no trouble such as clouding of the film. It is also preferable that the difference is not less than the lower limit, since a sufficient light diffusion effect can be thus achieved.

The content of the light-transmitting particles preferably amounts to 3 to 30% by weight, particularly preferably from 5 to 20% by weight, based on the total amount of the solid matters contained in the hard coat layer. It is preferable that the content of the light-transmitting particles is not more than the upper limit as defined above, since there arises no trouble such as clouding of the film. It is also preferable that the content thereof is not less than the lower limit, since a sufficient light diffusion effect can be thus achieved. When the content of the light-transmitting particles is expressed in the content thereof in the hard coat layer having been formed as the light diffusion layer, it ranges from 10 to 3000 mg/m$^2$, still preferably from 90 to 2000 mg/m$^2$.

Specific examples of the light-transmitting particles include particles of inorganic compounds such as silica particles and TiO$_2$ particles; and resin particles such as acryl particles, crosslinked acryl particles, polystyrene particles, crosslinked styrene particles, melamine resin particles and benzoguanamine resin particles. Among all, crosslinked styrene particles, crosslinked acryl particles, and silica particles are preferred. The light-transmitting particles may be either in a spherical or irregular shape.

Also, use can be made of two or more types of light-transmitting particles having different particle sizes. In the case of using two or more types of light-transmitting particles, the difference in refractive index between the particles having the highest refractive index and the particles having the lowest refractive index is preferably 0.02 or more but not more than 0.01, still preferably 0.03 or more but not more than 0.07 so as to effectively exert the effect of controlling refractive index due to mixing. The light-transmitting particles having a larger particle size can impart antiglare properties, while the light-transmitting particles having a smaller particle size can impart other optical characteristics. In the case of bonding an antireflective film to an ultrafine image display unit of 133 ppi or higher, for example, the unit should be free from any trouble in optical performance called dazzling. The problem of dazzling, which arises when pixels are enlarged or size-reduced due to irregularities (contributing to antiglare properties) on the film surface and the luminance becomes less uniform, can be considerably relieved by also using light-transmitting particles having a smaller particle size than the light-transmitting particles employed for imparting antiglare properties and a refractive index different from the refractive index of the binder.

Concerning the particle size distribution of the light-transmitting particles, as described above, monodispersion is most desirable. That is to say, it is preferred that the sizes of individual particles are as close as possible. In the case where particles having particle size larger by 20% or more than the average particle size are specified as coarse particles, for example, it is preferable that the content of these coarse particles is 1% or less of all particles, still preferably 0.1% or less and still preferably 0.01% or less. Light-transmitting particles having such a particle size distribution can be obtained by classifying particles after the completion of a usual synthesis reaction. Light-transmitting particles having a still preferable distribution can be obtained by performing the classification in an increased number or at an elevated level.

The particle size distribution of the light-transmitting particles is measured by the Coulter counter method and the distribution thus measured is converted into the particle number distribution.

[Inorganic Filler]

To elevate the refractive index of the layer and reduce contraction due to hardening, the hard coat layer preferably contains, in addition to the light-transmitting particles as described above, an inorganic filler which comprises oxide of at least one metal selected from among titanium, zirconium, aluminum, indium, zinc, tin and antimony and has an average particle size of 0.2 μm or less, preferably 0.1 μm or less and still preferably 0.06 μm or less.

To enlarge the difference in refractive index between the hard coat layer and the light-transmitting particles, it is also possible in a hard coat layer with the use of light-transmitting particles having a high refractive index to employ silicon oxide to thereby maintain the refractive index of the layer at a low level. The preferable particle size thereof is the same as the inorganic filler as described above.

Specific examples of the inorganic filler to be used in the hard coat layer include TiO$_2$, ZrO$_2$, Al$_2$O$_3$, Zn$_2$O$_3$, ZnO, SnO$_2$, Sb$_2$O$_3$, ITO and SiO$_2$. TiO$_2$ and ZrO$_2$ are preferred from the viewpoint of elevating refractive index. It is also preferable that the inorganic filler is surface-treated by silane coupling or titanium coupling. Use is preferably made of a surface-treating agent having a functional group capable of reacting with the binder on the filler surface.

The content of such an inorganic filler is preferably from 10 to 90% based on the total weight of the hard coat layer, still preferably from 20 to 80% and particularly preferably from 30 to 70%.

Because of having a particle size sufficiently smaller than the light wavelength, the inorganic filler causes no scattering. Therefore, a dispersion having the filler dispersed throughout the binder polymer behaves as an optically homogeneous substance.

The bulk refractive index of the mixture of the binder with the inorganic filler in the hard coat layer is preferably from 1.48 to 2.00, still preferably from 1.50 to 1.80. The refractive index can be controlled within the range as specified above by appropriately selecting the types and mixing ratio of the binder and the inorganic filler. It can be easily understood through preliminary experiments how to select these materials.

It is preferable to add the light-transmitting particles and the inorganic filler in the state of a dispersion to the hard coat layer. As the dispersion medium, use may be preferably made of a liquid having a boiling point of from 60 to 170° C. Examples of the dispersion medium include water, alcohols (for example, methanol, ethanol, isopropanol, butanol and benzyl alcohol), ketones (for example, acetone, methyl ethyl ketone, methyl isobutyl ketone and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexane), halogenated hydrocarbons (for example, methylene chloride, chloroform and carbon tetrachloride), aromatic hydrocarbons (for example, benzene, toluene and xylene), amides (for example, dimethylformamide, dimethylacetamide and n-methylpyrrolidone), ethers (for example, diethyl ether, dioxane and tetrahydrofuran), and ether alcohols (for example, 1-methoxy-2-propanol). Among all, toluene, xylene, methyl ethyl ketone, methyl isobutyl ketone, cyclohexanone and butanol are preferred.

Particles such as the light-transmitting particles and the inorganic filler can be dispersed in the medium with the use of a dispersion machine. Examples of the dispersion machine include a sand grinder mill (for example, a bead mill provided with pins), a high-speed impeller mill, a pebble mill, a roller mill, an attritor and a colloid mill. Among all, a sand grinder mill and a high-speed impeller mill are preferred. It is also possible to carry out a pre-dispersion treatment. Examples of the dispersion machine to be used in the pre-dispersion treatment include a ball mill, a three-roll mill, a kneader and an extruder.

The thickness of the hard coat layer is preferably from 0.05 to 10 μm, still preferably from 0.10 to 7 μm and still preferably from 3 μm to 5 μm.

[Thixotropic Agent]

In the antireflective film according to the invention, it is preferable that a thixotropic agent is contained in any of the layers. It is particularly preferred that a thixotropic agent is employed together with the particles in the step of forming the resin layer of the hard coat layer. The purpose of the addition of thixotropic agent is as follows. In developing the dispersion to form a thin layer, low viscosity characteristics are achieved under a high shear force to give favorable coating properties, while high viscosity characteristics are achieved in the static state after the completion of the development so as to prevent the fine particles from sedimentation. Thus, sedimentation of the particles during the hardening of the coated layer can be inhibited and, therefore, a large number of the particles remain on the surface to achieve a high distribution density. As a result, the obtained structure has excellent fineness and sufficiently small peaks and valleys for indication light from fine pixels.

As the thixotropic agent, therefore, use can be appropriately made of a transparent agent capable of preventing the particles contained in the coating solution form sedimentation due to, for example, thickening. Namely, any of publicly known thixotropic agents may be employed. Examples thereof include aerosil, layered organic clay, polyacrylic acid and ethylcellulose.

The content of the thixotropic agent may be appropriately determined depending on, for example, the viscosity characteristics of the dispersion. In general, the thixotropic agent is preferably employed in an amount of from 0.01 to 10 parts by weight, still preferably form 0.05 to 8 parts by weight and particularly preferably from 0.1 to 5 parts by weight per 100 parts by weight of the binder from the viewpoint of achieving both of favorable coating properties and the effect of preventing the sedimentation of the fine particles.

[Antistatic Layer]

It is preferable in the invention to provide an antistatic layer from the viewpoint of controlling static electricity on the film surface. The antistatic layer may be formed by a publicly known method such as the method of applying a coating solution comprising electrically conductive fine particles and a reactive hardening resin or the method of depositing or sputtering a metal or a metal oxide capable of forming a transparent film to thereby form a thin conductive film.

The antistatic layer may be formed directly on the transparent substrate. Alternatively, it may be formed via a primer layer so as to strengthen the bonding to the transparent substrate. In the case where the antistatic layer is formed close to the outermost layer in the constitution of the antireflective film, sufficient antistatic properties can be established even though the layer has a small thickness. The coating method is not particularly restricted. Namely, an appropriate method may be selected from among publicly known methods such as roll coating, gravure coating, bar coating and extrusion coating, depending on the characteristics of the coating solution and the coating amount. It is also preferable to control the refractive index of the antistatic layer so that the antistatic layer has also a function as a medium refractive index layer or a high refractive index layer.

The thickness of the antistatic layer is preferably from 0.01 to 10 μm, still preferably from 0.03 to 7 μm and still preferably from 0.05 to 5 μm.

The surface resistance of the antistatic layer is preferably from $10^5$ to $10^{12}\Omega/\square$ ($\Omega$/square), still preferably from $10^5$ to $10^9\Omega/\square$ and most desirably from $10^5$ to $10^9\Omega/\square$. From the viewpoint of preventing sticking of dust and debris to the antireflective film surface, it is preferable that the antireflective film surface resistance logSR is regulated to 12 or less, still preferably 10 or less, by providing the antistatic layer. The surface resistance of the antistatic layer can be measured at 25° C. under a humidity of 60% RH with the use of an ultra-insulating resistance/micro amperemeter "TR8601" (manufactured by ADVANTEST).

It is preferable that the antistatic layer is substantially transparent. More specifically speaking, the haze of the antistatic layer is preferably 10% or less, still preferably 5% or less, still preferably 3% or less and most desirably 1% or less. It preferably has a transmittance of light of 550 nm in wavelength of 50% or more, still preferably 60% or more, still preferably 65% or more and most desirably 70% or more.

Moreover, it is preferred that the antistatic layer has a high hardness. More specifically speaking, the hardness of the antistatic layer is preferably H or above, still preferably 2H or above, still preferably 3H or above and most desirably 4H or above, when determined by the pencil hardness test in accordance with JIS K-5400.

[Electrically Conductive Fine Particle in Antistatic Layer]

It is preferable that electrically conductive fine particles are inorganic particles made of a metal oxide or nitride. Examples of the metal oxide and nitride include tin oxide, indium oxide, zinc oxide and titanium nitride. Tin oxide and indium oxide are particularly preferred.

The electrically conductive fine particles may comprise such a metal oxide or nitride as the main component optionally together with other element(s). The term "main component" means the component having the largest content (% by weight) among the components constituting the particles. Examples of the other elements include Ti, Zr, Sn, Sb, Cu, Fe, Mn, Pb, Cd, As, Cr, Hg, Zn, Al, Mg, Si, P, S, B, Nb, In, V and halogen atoms. To elevate the electrical conductivity of tin oxide or indium oxide, it is preferable to add Sb, Pb, Nb, In, V and halogen atoms. Tin oxide containing Sb (ATO) and indium oxide containing Sn (ITO) are particularly preferable. The content of Sb in ATO is preferably from 3 to 20% by weight. The content of Sn in ITO is preferably from 5 t 20% by weight.

The average particle size of primary particles of the electrically conductive fine particles employed in the antistatic layer preferably ranges from 1 to 150 nm, still preferably from 5 to 100 nm and most desirably from 5 to 70 nm. The average particle size of the electrically conductive fine particles in the antistatic layer thus formed ranges from 1 to 200 nm, preferably from 5 to 150 nm, still preferably from 10 to 100 nm and most desirably from 10 to 80 nm. The average particle size of the electrically conductive fine particles is the mass-weighted average particle size which can be measured by the light scattering method or electron microscopic photographing.

The specific surface area of the electrically conductive fine particles is preferably from 10 to 400 $m^2/g$, still preferably from 20 to 200 $m^2/g$ and most desirably from 30 to 150 $m^2/g$.

The electrically conductive fine particles may have been surface-treated. The surface-treatment is performed by using an inorganic compound or an organic compound. Examples of the inorganic compound usable in the surface-treatment include alumina and silica. A treatment with silica is particularly preferred. Examples of the organic compound usable in the surface-treatment include polyols, alkanolamines, stearic acid, silane coupling agents and titanate coupling agents. A silane coupling agent is most desirable. It is also possible to carry out the surface-treatment by combining two or more surface-treating agents.

It is preferable that the electrically conductive fine particles are in a rice-grain shape, a spherical shape, a cubic shape, a spindle shape or an irregular shape. It is also possible to use two or more types of electrically conductive fine particles in the antistatic layer.

In the antistatic layer, the content of the electrically conductive fine particles preferably amounts to 20 to 90% by weight, still preferably 25 to 85% by weight and still preferably 30 to 80% by weight.

The electrically conductive fine particles are employed in the state of a dispersion in forming the antistatic layer. Preferable examples of the dispersion medium are the same as those cited as examples of the dispersion medium for [Inorganic filler].

[Production of Antireflective Film]

Each layer of the antireflective film according to the invention can be formed by dissolving the composition for forming the corresponding layer in a dispersion medium for coating, as will be described hereinafter, to give a coating solution and then applying it by a coating method such as dip coating method, air knife coating method, curatin coating method, roller coating method, die coating method, wire bar coating method, gravure coating method or extrusion coating method (U.S. Pat. No. 2,681,294). It is also possible to apply two or more layers simultaneously. For the simultaneous application, use may be made, without restriction, of methods reported in U.S. Pat. No. 2,761,791, U.S. Pat. No. 2,941,898, U.S. Pat. No. 3,508,947, U.S. Pat. No. 3,526,528 and KOTINGU KOGAKU, Yuji Harasaki, p. 253, Asakura Shoten (1973).

Since at least the low refractive index layer is layered in the antireflective film according to the invention, defect spots become noticeable in the presence of foreign matters such as dust and debris. The term "defect spots" as used herein means defects visible with the naked eye due to reflection on the coating. They can be detected with the naked eye by, for example, painting the back face of the antireflective film black after the coating. In general, defect spots visible with the naked eye are 50 μm or larger in size.

The antireflective film according to the invention preferably has 20 or less, still preferably 10 or less, still preferably 5 or less and particularly preferably 1 or less, defect spots per square meter. It is preferable from the viewpoint of yield ratio that the density of the defect spots falls within the above range. Moreover, such a film is also usable in producing an antireflective film in a larger size without any troubles.

To continuously produce the antireflective film according to the invention, the production method involves the step of continuously feeding a rolled transparent substrate film, the step of applying a coating solution, the step of drying the same, the step of hardening the coating, and the step of winding the substrate film having the thus hardened layer.

From a substrate film roll, the substrate film is continuously fed into a clean room. In the clean room, static electricity is eliminated from charged substrate film by a neutralization apparatus. Next, foreign matters sticking to the substrate film is eliminated by a cleaner. Then a coating solution is applied to the substrate film in the coating part located in the clean room and the thus coated substrate film is transported into a drying room and dried.

The substrate film having the dried coating layer is fed from the drying room to a radiation hardening room where it is exposed to radiation and thus the hardening resin contained in the coating layer is polymerized, thereby causing hardening. The substrate film having the layer hardened by the radiation is further transported to a thermosetting part and heated. Thus, hardening is completed. The substrate film having the thus completely hardened layer is wound into a roll.

The above-described steps may be performed for the formation of each layer. Alternatively, it is also possible to provide a plural number of systems each having a coating part-a drying room-a radiation hardening part-a thermosetting room so that individual layers are continuously formed. From the viewpoint of productivity, it is favorable to continuously form the individual layers.

Now, the method will be illustrated in greater detail by reference to an embodiment of the production apparatus shown in FIG. 1 which is preferably usable in the invention.

FIG. 1 is a schematic drawing which shows an embodiment of the production apparatus to be used in the invention.

The production apparatus shown by FIG. 1 has a web W for performing the continuous feeding step, a roll 1 thereof and a plural number of guide rollers (not shown in the drawing); a winding roll 2 for performing the winding step, and an appropriate number of layer-forming units 100, 200, 300 and 400 for performing the drying step and the coating-hardening step. In this embodiment mode, the layer-forming unit 100 is provided for forming a hard coat layer, the layer-forming unit 200 is provided for forming a medium refractive index layer, the layer-forming unit 300 is provided for forming a high refractive index layer and the layer-forming unit 400 is provided for forming a low refractive index layer.

Since these layer-forming units have the same structure, the layer-forming unit 100 will be now illustrated. The layer-forming unit 100 consists of a coating part 101 for performing the step of applying the coating solution, a drying part 102 for performing the step of drying the applied solution, and a hardening device 103 for performing the step of hardening the dried coating solution.

Although the apparatus shown by FIG. 1 is an example of the constitution wherein the four layers are continuously applied without winding, it is needless to say that the number of the layer-forming units can be varied depending on the layer constitution.

It is preferable that, by using an apparatus provided with three layer-forming units, a roll-type substrate film having the hard coat layer formed thereon is continuously fed and the hard coat layer, the high refractive index layer and the low refractive index layer are successively formed by the respective layer-forming units followed by winding. It is still preferable that, by using an apparatus provided with four layer-forming units as shown by FIG. 1, a roll-type substrate film is continuously fed and the hard coat layer, the medium refractive index layer, the high refractive index layer and the low refractive index layer are successively formed by the respective layer-forming units followed by winding.

Among the coating methods as cited above, it is generally preferable to employ the microgravure method. The high refractive index layer and the low refractive index layer in the invention can be formed by the microgravure method too. Thus, favorable surface conditions can be obtained with respect to the coating amount distribution in the longitudinal direction and various surface problems. Concerning the coating amount distribution in the width direction, moreover, satisfactory performance can be established by selecting the most desirable material and shape for a scratching blade.

An antireflective film with little defect spots, i.e., having defect spots within the scope as described above can be produced by precisely controlling the dispersion of inorganic fine particles in the coating composition for forming low refractive index layer and microfiltering the coating solution. It is preferable that, at the same time, the coating step in the coating part and the drying step in the drying room for forming each of the layers constituting the antireflective layer are performed in an atmosphere of a high air cleanliness and dust and debris are sufficiently removed from the film before the coating. The air cleanliness in the coating step and the drying step is preferably class 10 (not more than 353 particles ($\geqq 0.5$ μm)/m$^3$) or more, still preferably class 1 (not more than 35.5 particles ($\geqq 0.5$ μm)/m$^3$) or more, in accordance with US Federal Standard 209E. It is still preferable that a high air cleanliness is also achieved in the parts other than the coating-drying steps such as the winding part.

Examples of the dedusting method to be used in the dedusting step, which is a preliminary step before the coating, include dry dedusting methods such as a method of pressing a nonwoven fabric or a blade against the film surface as described in JP-A-59-150571; a method of spraying air of a high cleanliness at a high speed, thus stripping extraneous matters from the film surface and then sucking via a suction port closely located as described in JP-A-10-309553; and a method of spraying compressed air under ultrasonic vibration, thus stripping extraneous matters from the film surface and then sucking as described in JP-A-7-33613 (for example, NEW ULTRA CLEANER manufactured by SHINKO).

It is also possible to employ wet dedusting methods, for example, a method of introducing a film into a washing tank and stripping extraneous matters by using an ultrasonic vibrator; a method of supplying a washing liquor to a film and spraying air at a high speed followed by sucking, as described in JP-B49-13020; and a method of continuously rubbing a web with a moistened roll and jetting a liquid onto the rubbed face to thereby wash the web as described in JP-A-2001-38306. Among these dedusting methods, an ultrasonic dedusting method or a wet dedusting method is particularly favorable from the viewpoint of dedusting effect.

To elevate the dedusting effect and prevent sticking of dust and debris, it is particularly preferable that, before the dedusting step as described above, to eliminate static electricity from the substrate film. To remove the electricity, use can be made of an ionizer of the corona discharge type or an ionizer of the irradiation type (UV, soft X-ray and so on). Before and after the dedusting and coating, the electric potential of the substrate film is preferably 1000 V or less, still preferably 300 V or less and particularly preferably 100 V or less.

[Dispersion Medium for Coating]

The dispersion medium to be used in the coating solutions are not specifically restricted. Namely, either a single medium or a mixture of two or more media may be employed. Preferable examples of the dispersion medium include aromatic hydrocarbons such as toluene, xylene and styrene; chlorinated aromatic hydrocarbons such as chlorobenzene and ortho-dichlorobenzene; chlorinated aliphatic hydrocarbons including methane derivatives such as monochloromethane and ethane derivatives such as monochloroethane; alcohols such as methanol, isopropyl alcohol and isobutyl alcohol; esters such as methyl acetate and ethyl acetate; ethers such as ethyl ether and 1,4-dioxane; ketones such as acetone, methyl ethyl ketone, methyl isobutyl ketone and cyclohexanone; glycol ethers such as ethylene glycol monomethyl ether; alicyclic hydrocarbons such as cyclohexane; aliphatic hydrocarbons such as normal hexane; and mixtures of aliphatic or aromatic hydrocarbons. Among these media, it is particularly preferable to use a ketone alone or a mixture of two or more ketones as the dispersion medium.

The surface tension of the coating solution preferably ranges from 15 to 36 [mN/m], since unevenness in drying can be regulated so long as the surface tension falls within this range. It still preferably ranges from 17 [mN/m] to 32 [mN/m] and particularly preferably from 19 [mN/m] to 26 [mN/m]. The surface tension can be controlled by, for example, adding a leveling agent.

[Filtration]

Before the coating, it is preferable to filter the coating solution to be used in the coating. In the filtration, it is preferable to employ a filter having a pore size as small as possible so long as the components in the coating solution are not eliminated thereby. In the filtration, it is preferable to use a filter having an absolute filtration accuracy of form 0.1 to 10 μm, still preferably to use a filter having an absolute filtration accuracy of form 0.1 to 5 μm. The thickness of the filter is preferably from 0.1 to 10 mm, still preferably form 0.2 to 2 mm. In such a case, it is preferable to perform the filtration at a filtration pressure of 1.5 MPa or less, still preferably 1.0 MPa or less and still preferably 0.2 MPa or less.

The material of the filter is not particularly restricted, so long as the coating solution is not affected thereby. Specifically speaking, use can be made of the same filter materials as those employed in wet dispersions of the inorganic compounds as described above.

It is also preferable to ultrasonically disperse the filtered coating solution so as to accelerate defoaming of the dispersion and the retention of the dispersed state.

The drying and hardening conditions are not particularly restricted. These procedures can be carried out at a low temperature of from 50° C. to 150° C., preferably from 70 to 120° C. for 100 hours or shorter, more specifically within 0.5 hour to 10 hours.

{Properties of the Whole Antireflective Film}

[Haze and Average Reflectivity]

The antireflective film according to the invention thus formed has a haze of preferably from 0.3 to 70%, still preferably from 0.5 to 60%, an average reflectivity at 450 nm to 650 nm of preferably 3.0% or less, still preferably 2.5% or less. It is preferable that the antireflective film according to the invention has a haze and an average reflectivity respectively falling within the above ranges, since favorable antiglare properties or internal scattering properties and antireflective properties can be established without worsening transfer imaging thereby.

[Average Centerline Roughness (Ra) of Antireflective Film]

From the viewpoints of improving the visibility and enhancing the layer strength, the outermost face of the antireflective film according to the invention should have regulated fine peaks and valleys. These peaks and valleys on the outermost face should be formed so as to give an average centerline surface roughness Ra, as defined in accordance with JIS B-0601, of from 0.005 to 0.20 μm, preferably from 0.05 to 0.20 μm, and still preferably from 0.10 to 0.20 μm. When Ra is within the range as defined herein, the layer strength of the antireflective film would be improved or the durability would be improved. When Ra does not exceed the upper limit as defined herein, excessive light scattering on the surface of the antireflective film does not result in a decrease in contrast or excessive whiteness in the layer, thereby worsening image qualities.

Means of controlling the average centerline roughness (Ra) of the antireflective film are roughly classified into two types. That is, one means comprises controlling the average centerline roughness by regulating the type, particle size and amount of the light-transmitting particles as described above and the layer thickness of the hard coat layer. The other means comprises controlling the average centerline roughness by regulating the drying speed, viscosity and temperature of the coating solution. It is also preferable to add a gelling agent (for example, polyacrylamides, cellulose derivatives or polysaccharides) or a thixotropic agent. In this case, the hard coat layer may be free from any light-transmitting particles.

[Ten-Point Height of Irregularities (Rz) of Antireflective Film and Average Trimming Curve Length (RSm)]

From the viewpoints of enhancing layer strength and improving durability, it is preferable in the invention that Rz and RSm of the outermost face of the antireflective film according to the invention fall respectively within the ranges as specified below. The term "Rz" as used herein means the ten-point height of irregularities defined in accordance with JIS B-0601, while the term "RSm" means the average trimming curve length defined in accordance with JIS B-0601. That is, Rz preferably ranges from 0.02 to 3.0 μm, still preferably from 0.10 to 2.5 μm and most desirably from 0.20 to 2.0 μm. Rsm preferably ranges from 10 to 200 μm, still preferably from 15 to 150 μm and most desirably from 20 to 100 μm.

[Average Centerline Roughness (Ra) of Hard Coat Layer]

From the viewpoints of improving the durability of the resultant antireflective film and enhancing the layer strength, it is preferable that the surface of the hard coat layer on which the low refractive index layer is to be formed has fine peaks and valleys.

Considering improvement in the durability after storing under a high humidity or wide temperature swings, these peaks and valleys are formed so as to preferably give an average centerline surface roughness Ra, as defined in accordance with JIS B-0601, of from 0.005 to 0.30 μm, still preferably from 0.05 to 0.30 μm and most desirably from 0.10 to 0.30 μm.

Considering improvement in durability after storing in an ozone-containing atmosphere, the average centerline surface roughness Ra preferably ranges from 0.007 to 0.20 μm. The average centerline surface roughness Ra can be controlled within this range mainly by the two means as discussed above. Although either means is efficacious therefor, a hard coat layer containing antistatic inorganic fine particles is particularly preferable since peaks and valleys on its surface can be easily controlled.

[Scratch Resistance of Antireflective Film]

In the rubbing test with cotton swab moistened with water, the antireflective film according to the invention preferably shows a critical load of the film surface after exposing to 10 ppm of ozone for 192 hours of 400 g or more, still preferably 500 g or more and still preferably 600 g or more.

The critical load in the rubbing test with cotton swab moistened with water is determined as follows.

Each sample is processed to give a polarizing plate which is then stored in the environment of an ozone concentration of 10 ppm at 30° C. and 60% RH for 192 hours (8 days) and then taken out into the atmosphere. A cotton swab (HEALTH REFRE® manufactured by TOYO EIZAI) is fixed to the rubbing head of a rubbing tester. In a flat dish, the sample is fixed by clipping at the top and the bottom. Then the sample and the cotton swab are dipped in water at 25° C. at a room temperature of 25° C. Under applying a load on the cotton swab, rubbing is reciprocally repeated 20 times.

After rubbing in a distance (one way) of 1 cm at a rubbing speed of about two recipocations per second, water on the sample surface is evaporated. Then it is examined with the naked eye whether or not the layer peels off. The test is repeated 10 times for each sample. The initial load is 100 g and the load is increased by 50 g until layer-peeling is observed 5 times or more. Then the load under which the layer-peeling occurs less than 5 times in repeating the test 10 times is defined as the critical load. The layer-peeling is judged by observing a change in the reflection state with the naked eye. When a layer showing a change in the reflection state is observed under an electron microscope, it is found out that the layer thickness of the uppermost layer is reduced by 5% or more or the uppermost layer or other constituting layer(s) peel off.

[Transparent Substrate]

As the transparent substrate in the antireflective film according to the invention, it is preferable to employ a plastic film. Examples of the polymer constituting the plastic film include cellulose esters {for example, triacetylcellulose and diacetyl cellulose typified by FUJITAC TD80U and FUJITAC TD80UF, manufactured by FUJI PHOTOFILM Co., Ltd.), polyamides, polycarboantes, polyesters (for example, polyethylene terephthalate and polyethylene naphthalate), polystyrenes, polyolefins, norbornene resins (for example, ARTON manufactured by JSR) and amorphous polyolefins (for example, ZEONEX manufactured by ZEON)}. Among these materials, tricetyl cellulose, polyethylene terephthalate and polyethylene naphthalate are preferable and triacetylcellulose is particularly preferable.

A cellulose acylate (for example, triacetylcellulose) film comprises either a single layer or a plurality of layers. A single-layered cellulose acylate film is produced by the drum casting or band casting method disclosed in JP-A-7-11055 and so on. On the other hand, the latter multilayered cellulose acylate film can be produced by the so-called simultaneous casting method disclosed in JP-A-61-94725, JP-B-62-43846 and so on. That is to say, starting material flakes are dissolved in a solvent such as a halogenated hydrocarbon (for example, dichloromethane), an alcohol (for example, methanol, ethanol or butanol), an ester (for example, methyl formate or methyl acetate) or an ether (for example, dioxane, dioxolane or diethyl ether) followed by, if needed, the addition of various additives such as a plasticizer, an ultraviolet light absorber, an antioxidant, a slipping agent and a peeling accelerator. Then the obtained solution (hereinafter sometimes referred to as a dope) is cast onto a support in the form of a horizontal endless metallic belt or a rotating drum by using a dope-supplying means (hereinafter sometimes referred to as a die). In the case of producing a single-layered film, a single dope is cast to give a single layer. In the case of producing a multilayered film, a low concentration dope is cast together in both sides of a high concentration cellulose ester dope. When the dope(s) are dried to a certain extent on the support, the film to which rigidity has been thus imparted is peeled off from the support. Then, the film is passed thorough a drying part by using various transporting means to thereby eliminate the solvent.

Dichloromethane is a typical example of the solvent for dissolving the cellulose acylate as described above. Considering the global environment and working conditions, however, it is preferable to use a solvent substantially free from any halogenated hydrocarbons such as dichloromethane. The expression "substantially free from" means the halogenated hydrocarbon content in the organic solvent is less than 5% by weight (preferably less than 2% by weight).

In order to prepare a cellulose acylate dope with the use of a solvent substantially free from any halogenated hydrocarbons, it is required to employ a specific dissolution method as will be illustrated hereinafter.

The first dissolution method which is called the cold dissolution method is carried out as follows.

First, cellulose acylate is slowly added to a solvent at a temperature around room temperature (−10 to 40° C.) under stirring. Next, the obtained mixture is cooled to −100 to −10° C. (preferably −80 to −10° C., still preferably −50 to −20° C. and most desirably −50 to −30° C.9. The cooling can be carried out in, for example, a dry ice/methanol bath (−75° C.) or a cooled diethylene glycol solution (−30 to −20° C.). Due to the cooling, the mixture of cellulose acylate with the solvent solidifies. Then it is heated to 0 to 200° C. (preferably 0 to 150° C., still preferably 0 to 120° C. and most desirably 0 to 50° C.) to give a solution of cellulose acylate existing in a fluidized state in the solvent. The heating may be carried out either by merely allowing to stand at room temperature or by heating in a hot bath.

The second dissolution method which is called the hot dissolution method is carried out as follows.

First, cellulose acylate is slowly added to a solvent at a temperature around room temperature (−10 to 40° C.) under stirring. It is preferable that the cellulose acylate solution according to the invention is prepared by adding cellulose acylate in a solvent mixture containing various solvents and allowing it to swell therein. In this method, the dissolution concentration of cellulose acylate is preferably 30% by weight or less, though a higher concentration is preferred from the viewpoint of drying efficiency in during the film formation. Next, the organic solvent mixture is heated to 70 to 240° C. (preferably 80 to 220° C., still preferably 100 to 200° C. and most desirably 100 to 190° C.) under elevated pressure of 0.2 MPa to 30 MPa. Since such a heated solution cannot be applied as such, it should be cooled to a temperature corresponding to the lowest boiling point of the solvents employed or lower. In this case, it is a common practice to cool the mixture to −10 to 50° C. and control the pressure to the atmospheric level. The cooling can be carried out by merely allowing the high-pressure and high-temperature container and the production line having the cellulose acylate solution therein at room temperature. It is still preferable to cool these devices with the use of a refrigerant such as cooling water. A cellulose acylate film substantially free form any halogenated hydrocarbons such as dichloromethane and a method of producing the same are described in Japan Institute of Invention and Innovation Journal of Technical Disclosure No. 2001-1745 (2001.03.15, hereinafter abbreviated as Journal of Technical Disclosure No. 2001-1745).

[Utilization of Antireflective Film in Liquid Display Unit]

In using the antireflective film according to the invention in a liquid display unit, it is provided as the outermost face of the image display unit by, for example, forming an adhesive layer on one face. In the case where the transparent substrate is made of triacetylcellulose, triacetylcellulose is employed as a protective film for protecting the polarizing layer of a polarizing plate. Therefore, it is also favorable from the viewpoint of cost to employ the antireflective film according to the invention as such as a protective film.

[Saponification Treatment]

In the case where the antireflective film according to the invention is provided as the outermost face of an image display unit or as a protective film as such, it is preferable to make the surface of the antireflective film in the side opposite to the side having the antireflective layer (hereinafter sometimes called the back face of the antireflective film) hydrophilic by treating with an alkali. The saponification can be carried out by a publicly known procedure, for example, dipping the film in an alkali solution for an appropriate time. After dipping in the alkali solution, it is preferable to sufficiently wash the film with water or neutralize the alkali component by dipping in a dilute acid, thereby eliminating the alkali component remaining in the film.

The hydrophilic surface of the back face of the transparent substrate of the antireflective film is particularly effective in improving the adhesiveness to a polarizing film comprising polyvinyl alcohol as the main component. Since dust and debris in the atmosphere hardly stick to the hydrophilic surface, moreover, dust and debris scarcely enter into the space between the polarizing layer and the antireflective film in the step of adhering to the polarizing film, which brings about another advantage of preventing defect spots caused by dust and debris.

It is preferable to perform the saponification treatment so that the contact angle of the transparent substrate surface in the back face of the antireflective film to water becomes 40° or smaller, still preferably 30° or smaller and particularly preferably 20° or smaller.

In practice, the alkali saponification can be carried out by a procedure selected from among the following means (1) to (4). Among them, the means (1) is favorable from the viewpoint that the treatment can be carried out in the same step as the cellulose acylate film formation commonly employed. However, the means (1) suffers from some problems such that the antireflective layer surface is also saponified and thus the layer is deteriorated due to alkali-hydrolysis and that the remaining saponification solution would cause stains. In contrast, the means (2) is favorable since the adhesiveness of the low refractive index layer in the antireflective film according to the invention to the layer provided below it can be also improved thereby.

(1) After forming until the low refractive index layer of the antireflective layer on the transparent substrate, the film is dipped at least once in an alkali solution to thereby saponify the front face and the back face of the antireflective film.

(2) Before forming the low refractive index layer on the transparent substrate, the film is dipped at least once in an alkali solution to thereby saponify the front face and the back face of the transparent substrate having the layers formed before the formation of the low refractive index layer. In this case, the face on which the low refractive index layer is to be formed is also alkali-treated.

(3) After forming until the low refractive index layer of the antireflective layer on the transparent substrate, the face of the film in the low refractive index layer side is protected with a laminate and then the film is dipped at least once in an alkali solution to thereby saponify the back face of the antireflective film.

(4) Before or after forming the antireflective film on the transparent substrate, an alkali solution is applied on the face of the transparent substrate opposite to the face on which the antireflective film is to be formed. Then the transparent substrate is heated, washed with water and/or neutralized to thereby saponify the back face alone of the antireflective film.

Accordingly, it is preferable that the antireflective film according to the invention has been preliminarily alkali-treated exclusively in the face on which the low refractive index layer is to be formed.

By forming individual layers on the transparent substrate as described above, the antireflective film according to the invention can be obtained.

[Polarizing Plate]

The polarizing plate according to the invention is characterized by having the antireflective film according to the invention as described above.

Moreover, it is preferable that, in the polarizing plate according to the invention, at least one of the films constituting the polarizing plate has an Re retardation value of 20 or more but not more than 70 nm and an Rth retardation value of 70 or more but not more than 400 nm.

The Re retardation value and the Rth retardation value as used herein are respectively defined by the following numerical formulae (2) and (3).

$Re=(nx-ny) \times d$             Numerical formula (2):

$Rth=\{(nx+ny)/2-nz\} \times d$        Numerical formula (3):

In the numerical formulae (2) and (3), nx is a refractive index along the slow axis direction (the direction giving the maximum refractive index) in the film plane; ny is a refractive index along the fast axis (the direction giving the minimum refractive index) in the film plane; nz is a refractive index along the thickness direction of the film; and d is the thickness of the film expressed in nm.

In usual, a polarizing plate comprises a polarizing layer and two protective films provided in both side thereof. It is preferable in the invention that the antireflective film according to the invention is employed as at least one of these protective films between which the polarizing film is inserted. By using the antireflective film also as the protective film, the production cost of the polarizing plate can be reduced. By using the antireflective film as the outermost layer, the reflection of outside light can be prevented and a polarizing plate having excellent scratch resistance, antifouling properties and so on can be obtained.

As the polarizing film, use may be made of a publicly known polarizing film or a polarizing film cut out from a continuous polarizing layer sheet the absorption axis of which is neither parallel nor perpendicular to the lengthwise direction. Such a continuous polarizing layer sheet the absorption axis of which is neither parallel nor perpendicular to the lengthwise direction can be produced by the following method.

That is, it can be produced by a stretching method which comprises stretching a polymer (for example, polyvinyl alcohol) film by applying a tension while holding both ends of the film by holding members, stretching the thus obtained polarizing layer at a stretching ratio of at least 1.1 to 20.0 in the film width direction, and flexing the film-traveling direction while holding its both ends so that the difference in the speed in the lengthwise direction between the holding members at the both ends of the film is not more than 3% and the angle between the film-traveling direction at the outlet of the step holding the both ends of the film and the actual stretching direction of the film is inclined at 20 to 70°. From the viewpoint of productivity, a film with an incline angle of 45° is preferably employed.

Methods of stretching polymer films are described in detail in paragraphs [0020] to [0030] in JP-A-2002-86554.

[Display Unit and Liquid Crystal Mode]

The display unit according to the invention is characterized by having the antireflective film according to the invention as discussed above.

That is to say, the antireflective film according to the invention is applicable to image display units such as a liquid crystal display (LCD), a plasma display panel (PDP), an electroluminescence display (ELD) and a cathode ray tube (CRT). Because of having the transparent substrate, the transparent substrate side of the antireflective film according to the invention is bonded to the image display face of the image display unit.

As one of the surface-protective films of a polarizing layer, the antireflective film according to the invention is preferably usable in liquid crystal display units of transmission, reflection and semi-transmission modes such as twisted nematic (TN), super-twisted nematic (STN), vertical alignment (VA), in-place switching (IPS) and optically compensated bend cell (OCB) modes.

Liquid crystal cells of the VA mode include:

(1) a liquid crystal cell of VA mode in a narrow sense, in which rod-like liquid crystal molecules are essentially vertically aligned while voltage is not applied, and the molecules are essentially horizontally aligned while voltage is applied (JP-A-2-176625);

(2) a liquid crystal cell of MVA mode, in which the VA mode is modified to be multi-domain type so as to enlarge the viewing angle (described in SID97, Digest of tech. Papers, 28(1997), 845);

(3) a liquid crystal cell of n-ASM mode, in which rod-like liquid crystal molecules are essentially vertically aligned while voltage is not applied, and the molecules are essentially oriented in twisted multi-domain alignment while voltage is applied (described in *Nippon Ekisho Toronkai* [Liquid crystal forum of Japan], Digest of tech. Papers (1998), 58-59); and (4) a liquid crystal cell of SURVAIVAL mode (published in LCD international 98).

In a liquid crystal cell of the VA mode, it is preferable to employ a polarizing plate constructed by combining a biaxially stretched triacetylcellulose film with the antireflective film according to the invention. To produce such a biaxially stretched triacetylcellulose film, use may be preferably made of methods reported in, for example, JP-A-2001-249223 and JP-A-2003-170492.

A liquid crystal cell of the OCB mode is a liquid crystal display unit with the use of a liquid crystal cell of bed alignment mode, in which rod-like liquid crystal molecules are aligned essentially in opposite directions (symmetrically) in the upper part and the lower part, as disclosed in U.S. Pat. No. 4,583,825 and U.S. Pat. No. 5,410,422. Since the rod-like liquid crystal molecules are symmetrically aligned in the upper part and the lower part, this liquid cell of the bend alignment mode has a self-optically compensatory function. Therefore, this liquid crystal mode is also called OCB (optically compensatory bend) liquid crystal mode. Such a liquid crystal display device of the bend alignment mode has an advantage of having a high response speed.

A liquid crystal cell of the ECB mode, in which rod-like liquid crystal molecules are essentially horizontally aligned while voltage is not applied, has been most frequently used as a color TFT liquid crystal display unit and reported in a large number of documents, for example, EL, PDP, LCD Display, Toray Research Center (2001).

As described in, for example, JP-A-2001-10004, it is particularly preferable that in liquid crystal display units of the TN mode and the IPS mode, an optically compensatory film is used in the opposite side of the antireflective film according to the invention, which is employed as one of the protective films in the front and back faces of a polarizing layer, to thereby give a polarizing plate having an antireflective effect and a viewing angle-enlarging effect at the thickness of a single polarizing plate alone.

EXAMPLES

Now, the invention will be illustrated in greater detail by reference to the following EXAMPLES. However, it is to be understood that the invention is not construed as being restricted thereto. Unless otherwise noted, all "parts" and "%" are by weight.

[Preparation of Coating Solution of Composition for Forming Each Layer]

{Preparation of Coating Solution of Composition for Forming Hard Coat Layer (A-1)}

45 g of a mixture of pentaerythritol triacrylate with pentaerythritol tetraacrylate "KAYARAD" (manufactured by NIPPON KAYAKU Co., Ltd.) and 5 g of a mixture of dipentaerythritol pentaacrylate with dipentaerythritol hexaacrylate "DPHA" (manufactured by NIPPON KAYAKU Co., Ltd.) were diluted with 23.5 g of toluene and 15.0 g of cyclohexanone. After adding 2 g of a mixture (1:1 by weight) of polymerization initiators "Irgacure 184" and "Irgacure 907" (both manufactured by Ciba Specialty Chemicals), the resultant mixture was mixed by stirring. The solution was applied and UV-hardened. The coating thus obtained had a refractive index of 1.51.

The liquid mixture thus obtained was filtered through a polypropylene filter having a pore size of 30 µm to thereby give a coating solution of composition for forming hard coat layer (A-1).

{Preparation of Coating Solution of Composition for Forming Hard Coat Layer (A-2)}

To the coating solution of composition for forming hard coat layer (A-1) as described above, 1.7 g of a 30% toluene dispersion of crosslinked polystyrene particles "SX-350" (refractive index 1.61, manufactured by SOKEN KAGAKU K.K.) having an average particle size of 3.5 µm and having been dispersed in a Polytron dispersing machine at 10000 rpm for 20 minutes and 13.3 g of a 30% toluene dispersion of crosslinked acryl-styrene particles (refractive index 1.55, manufactured by SOKEN KAGAKU K.K.) having an average particle size of 3.5 µm were added thereto. Finally, 0.75 g of a fluorine-based surface modifier (FP-1) represented by the following chemical formula (4) and 10 g of a silane coupling agent "KBM-5103" (manufactured by SHIN-ETSU CHEMICAL Co., Ltd.) were added.

The obtained liquid mixture was filtered through a polypropylene filter having a pore size of 30 µm to thereby give a coating solution of composition for forming hard coat layer (A-2).

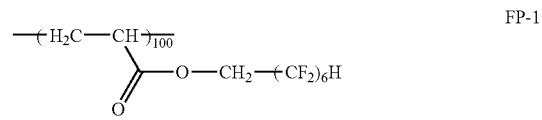

FP-1

{Preparation of Coating Solution of Composition for Forming Hard Coat Layer (A-3)}

To the coating solution of composition for forming hard coat layer (A-1) as described above was added 35 g of a dispersion prepared by dispersing a 30% toluene dispersion of classified, strengthened and crosslinked polymethyl methacrylate (PMMA) particles "MXS-300" (crosslinking agent: ethylene glycol dimethacrylate, crosslinking agent content 30%, refractive index 1.49, manufactured by SOKEN KAGAKU K.K.) having an average particle size of 3.0 µM dispersed in a Polytron dispersing machine at 10000 rpm for 20 minutes. Next, 90 g of a dispersion prepared by dispersing a 30% toluene dispersion of silica particles "SEAHOSTAR KE-P150" (refractive index 1.46, manufactured by NIPPON SHOKUBAI) having an average particle size of 1.5 µm dispersed in a Polytron dispersing machine at 10000 rpm for 30 minutes was further added thereto. The obtained liquid mixture was mixed by stirring.

The obtained liquid mixture was filtered through a polypropylene filter having a pore size of 30 µm to thereby give a coating solution of composition for forming hard coat layer (A-3).

{Preparation of Coating Solution of Composition for Forming Hard Coat Layer (A-4)}

A coating solution of composition for forming hard coat layer (A-4) was prepared as in the preparation of the coating solution of composition for forming hard coat layer (A-3) as described above but using, as a substitute for the silica particles having an average particle size of 1.5 µm, 130 g of a 30% toluene dispersion of classified, strengthened and high-crosslinked PMMA particles "MXS-150H" (crosslinking agent: ethylene glycol dimethacrylate, crosslinking agent content 30%, refractive index 1.49, manufactured by SOKEN KAGAKU K.K.) having an average particle size of 1.5 µm.

{Preparation of Coating Solution of Composition for Forming Hard Coat Layer (A-5)}

A coating solution of composition for forming hard coat layer (A-5) was prepared as in the preparation of the coating solution of composition for forming hard coat layer (A-2) as described above but using, as a substitute for the polystyrene particles having an average particle size of 3.5 µm, 20 g of a 30% methyl isobutyl ketone dispersion of classified, high-strengthened and high-crosslinked PMMA particles "MXS-300H" (crosslinking agent: ethylene glycol dimethacrylate, crosslinking agent content 30%, refractive index 1.49, manufactured by SOKEN KAGAKU K.K.) having an average particle size of 3.0 μm.

{Preparation of Coating Solution of Composition for Forming Hard Coat Layer (B-1)}

285 g of a marketed zirconia-containing UV-hardening hard coat solution "DESOLITE Z7404" (manufactured by JSR, solid content about 61%, $ZrO_2$ content in solid matters about 70%, containing polymerizable monomer and polymerization initiator) was mixed with 85 g of a mixture of dipentaerythritol pentaacrylate with dipentaerythritol hexaacrylate "DPHA" (manufactured by NIPPON KAYAKU Co., Ltd.) and the obtained mixture was diluted with 60 g of methyl isobutyl ketone and 17 g of methyl ethyl ketone. After further adding 28 g of a silane coupling agent "KBM-5103" (manufactured by SHIN-ETSU CHEMICAL Co., Ltd.), the resultant mixture was mixed by stirring. The solution was applied and UV-hardened. The coating thus obtained had a refractive index of 1.61.

To the solution thus obtained, 1.7 g of a 30% toluene dispersion of crosslinked polystyrene particles "SX-350" (refractive index 1.61, manufactured by SOKEN KAGAKU K.K.) having an average particle size of 3.5 μm and having been dispersed in a Polytron dispersing machine at 10000 rpm for 20 minutes and 13.3 g of a 30% toluene dispersion of crosslinked acryl-styrene particles (refractive index 1.55, manufactured by SOKEN KAGAKU K.K.) having an average particle size of 3.5 μm were added thereto. Finally, 0.75 g of the fluorine-based surface modifier (FP-1) represented by the above chemical formula (4) and 10 g of a silane coupling agent "KBM-5103" (manufactured by SHIN-ETSU CHEMICAL Co., Ltd.) were added.

The obtained liquid mixture was filtered through a polypropylene filter having a pore size of 30 μm to thereby give a coating solution of composition for forming hard coat layer (B-1).

{Preparation of Coating Solution of Composition for Forming Hard Coat Layer (C-1)}

A coating solution of composition for forming hard coat layer (C-1) was prepared as in the preparation of the coating solution of composition for forming hard coat layer (A-2) as described above but adding 1 part of organic clay per 100 parts of the solid matters contained in the coating solution (A-2).

{Preparation of Coating Solution of Composition for Forming Hard Coat Layer (C-2)}

A coating solution of composition for forming hard coat layer (C-2) was prepared as in the preparation of the coating solution of composition for forming hard coat layer (A-3) as described above but adding 0.5 part of fine silica particles "AEROSIL 200" (average primary particle size 12 nm, refractive index 1.46, manufactured by NIPPON AEROSIL) per 100 parts of the solid matters contained in the coating solution (A-3).

{Preparation of Coating Solution of Composition for Forming Hard Coat Layer (C-3)}

A coating solution of composition for forming hard coat layer (C-3) was prepared as in the preparation of the coating solution of composition for forming hard coat layer (A-3) as described above but adding 0.5 part of fine silica particles "AEROSIL 200" (average primary particle size 12 nm, refractive index 1.46, manufactured by NIPPON AEROSIL) 100 parts of the solid matters contained in the coating solution (A-3) and further adding 0.1 part of "BRIGHT 20GNR4.6-H" (nickel/gold-plated spherical powder of benzoguanaimine/melamine/formaldehyde condensation product, manufactured by Nippon Chemical Industrial Co., Ltd.).

{Preparation of Coating Solution of Composition for Forming Low Refractive Index Layer (D-1)}

To 18 g of a heat-crosslinkable fluorine-containing polymer "JTA113" having a refractive index of 1.43 (solid content 6%, main solvent methyl ethyl ketone, manufactured by JSR) were added 2g of methyl ethyl ketone and 0.6 g of cyclohexanone. After stirring, the resultant mixture was filtered through a polypropylene filter having a pore size of 1 μM to give a coating solution of composition for forming low refractive index layer (C-1) to be used in Comparative Examples.

{Preparation of Coating Solution of Composition for Forming Low Refractive Index Layer (D-2)}

100 g of trifluoropropyltrimethoxysilane, 200 g of tridecafluorooctyltrimethoxysilane, 1700 g of tetraethoxysilane, 200 g of isobutanol and 6 g of aluminum acetylacetonate were fed into a flask and stirred. Next, 500 g of a 0.25 mol/L aqueous solution of acetic acid was dropped in portions. After the completion of the addition, the mixture was stirred at room temperature for 3 hours. Then 600 g of diacetone alcohol was added and the mixture was filtered through a polypropylene filter having a pore size of 1 μm to give a coating solution of composition for forming low refractive index layer (D-2).

{Preparation of Coating Solution of Composition for Forming Low Refractive Index Layer (D-3)}

A coating solution of composition for forming low refractive index layer (D-3) was prepared as in the preparation of the coating solution of composition for forming low refractive index layer (D-2) as described above but adding 30 g of a silicone-based leveling agent "L-9000(CS100)" (linear dimethyl silicone-EO block copolymer, manufactured by Nippon Unicar Co., Ltd.) in the final step.

{Preparation of Coating Solution of Composition for Forming Low Refractive Index Layer (D4)}

A coating solution of composition for forming low refractive index layer (D-4) was prepared as in the preparation of the coating solution of composition for forming low refractive index layer (D-3) as described above but adding 50 g of a silane coupling agent "KBM-5103" (3-acryloxypropyltrimethoxysilane, manufactured by SHIN-ETSU CHEMICAL Co., Ltd.) before dropping the 0.25 mol/L aqueous solution of acetic acid.

{Preparation of Coating Solution of Composition for Forming Low Refractive Index Layer (D-5)}

100 g of 3-glycidoxypropyltrimethoxysilane, 1000 g of trifluoropropyltrimethoxysilane, 400 g of heptadecafluorodecyltrimethoxysilane, 500 g of tetraethoxysilane and 200 g of isobutanol were fed into a flask and stirred. Next, 419 g of a 0.25 mol/L aqueous solution of acetic acid was dropped in portions. After the completion of the addition, the mixture was stirred at room temperature for 3 hours. Then 6 g of aluminum acetylacetonate was added and the mixture was stirred for additional 3 hours. Subsequently, 600 g of diacetone alcohol was added and the obtained mixture was filtered through a polypropylene filter having a pore size of 1 μm to give a coating solution of composition for forming low refractive index layer (D-5).

{Preparation of Coating Solution of Composition for Forming Low Refractive Index Layer (D-6)}

A coating solution of composition for forming low refractive index layer (D-6) was prepared as in the preparation of the coating solution of composition for forming low refractive index layer (D-5) as described above but adding 30 g of a silicone-based leveling agent "X-22-163C" (terminal epoxy-modified silicone, manufactured by SHIN-ETSU CHEMICAL Co., Ltd.) in the final step.

{Preparation of Coating Solution of Composition for Forming Low Refractive Index Layer (D-7)}

A coating solution of composition for forming low refractive index layer (D-7) was prepared as in the preparation of the coating solution of composition for forming low refractive index layer (D-6) as described above but adding 50 g of a silane coupling agent "KBM-5103" (3-acryloxypropyltrimethoxysilane, manufactured by SHIN-ETSU CHEMICAL Co., Ltd.) before dropping the 0.25 mol/L aqueous solution of acetic acid.

{Preparation of Coating solution of Composition for Forming Low Refractive Index Layer (E-1)}

To 100 g of the Coating Solution of Composition for Forming Low Refractive Index Layer (D4) as described above was added 97 g of a hollow silica dispersion (particle size about 40 to 50 nm, shell thickness 6 to 8 nm, refractive index 1.31, solid concentration 20%, main solvent isopropyl alcohol, prepared in accordance with Preparation Example 4 in JP-A-2002-79616 but altering particle size). After stirring, the mixture was subjected to multistage filtration through polypropylene filters of 30 μm, 10 μm and 1 μm in pore size. Thus, a coating solution of composition for forming low refractive index layer (E-1) was prepared.

{Preparation of Coating Solution of Composition for Forming Low Refractive Index Layer (E-2)}

To 100 g of the coating solution of composition for forming low refractive index layer (D-4) as described above was added 147 g of a hollow silica dispersion (particle size about 40 to 50 nm, shell thickness 6 to 8 nm, refractive index 1.31, solid concentration 20%, main solvent isopropyl alcohol, prepared in accordance with Preparation Example 4 in JP-A-2002-79616 but altering particle size). After stirring, the mixture was subjected to multistage filtration through polypropylene filters of 30 μm, 10 μm and 1 μm in pore size. Thus, a coating solution of composition for forming low refractive index layer (E-2) was prepared.

{Preparation of Coating Solution of Composition for Forming Low Refractive Index Layer (E-3)}

To 100 g of the coating solution of composition for forming low refractive index layer (D-7) as described above was added 97 g of a hollow silica dispersion (particle size about 40 to 50 nm, shell thickness 6 to 8 nm, refractive index 1.31, solid concentration 20%, main solvent isopropyl alcohol, prepared in accordance with Preparation Example 4 in JP-A-2002-79616 but altering particle size). After stirring, the mixture was subjected to multistage filtration through polypropylene filters of 30 μm, 10 μm and 1 μm in pore size. Thus, a coating solution of composition for forming low refractive index layer (E-3) was prepared.

{Preparation of Coating Solution of Composition for Forming Antistatic Layer (AS-1)}

To 100 g of an ATO dispersion hard coat agent "Peltron C4456-S7" manufactured by Nippon Pelnox Co., Ltd. (solid content 45%) were added 30 g of cyclohexanone, 10 g of methyl ethyl ketone and 1.5 g of "KBM-5103" (3-acryloxypropyltrimethoxysilane, manufactured by SHIN-ETSU CHEMICAL Co., Ltd.). After stirring, the mixture was filtered through a polypropylene filter having a pore size of 10 μm. Thus, a coating solution of composition for forming antistatic layer (AS-1) was prepared.

{Preparation of Coating Solution of Composition for Forming Antistatic Layer (AS-2)}

Based on the solid matters in "DESLITE KZ6805" manufactured by JSR (solid content 5%, hard coat agent, content of inorganic matters in solids 80%, using acrylate-type binder, main component of inorganic matters being antimony dope tin oxide particles having primary particle size of about 15 nm), 1% of a silane coupling agent "KBM-5103" (3-acryloxypropyltrimethoxysilane, manufactured by SHIN-ETSU CHEMICAL Co., Ltd.) was added. After stirring, the mixture was filtered through a polypropylene filter having a pore size of 10 μm. Thus, a coating solution of composition for forming antistatic layer (AS-2) was prepared.

Example 1

Construction of Antireflective Film

Comparative Example 1-1

Construction of Antireflective Film Sample 101

(1) Formation of Hard Coat Layer

A triacetylcellulose film of 80 μm in thickness (FUJITAC TAC-TD80U, manufactured by FUJI PHOTOFILM Co., Ltd.) was unwound in a rolled state. Then the coating solution of composition for forming hard coat layer (A-1) as described above was applied by using a microgravure roll (diameter: 50 mm) having a gravure pattern of a line density of 180 lines/in. and a depth of 40 μm and a doctor blade at a gravure roll rotation speed of 30 rpm and a conveying speed of 35 m/min. After drying at 60° C. for 150 seconds, the coating layer was hardened by irradiating under nitrogen-purge with ultraviolet light at 250 mJ/cm$^2$ by using an air-cool metal halide lamp (160 W/cm, manufactured by EYEGRAPICS Co., Ltd.) at an illuminance of 400 mW/cm$^2$. Thus a hard coat layer of 4.6 μm in thickness was formed followed by winding.

(2) Formation of Low Refractive Index Layer

Based on the solid matters (remaining after the evaporation of the volatile organic solvent) in the coating solution of composition for forming low refractive index layer (D-1) as described above, 1% by weight of isophorone diisocyanate was added immediately before the application of the coating solution (D-1) and the mixture was applied on the hard coat layer formed above with the use of a bar coater. After drying at 80° C. for 5 minutes, it was hardened at 120° C. for 20 minutes. Then it was irradiating under nitrogen-purge with ultraviolet light at 200 mJ/cm$^2$ by using an air-cool metal halide lamp (240 W/cm, manufactured by EYEGRAPICS Co., Ltd.) at an illuminance of 400 mW/cm$^2$. Thus a low refractive index layer of 100 nm in thickness was formed followed by winding. The antireflective film sample thus obtained was referred to as sample 101. In constructing antireflective films other than the sample 101, 1% by weight, based on the solid matters in each coating solution of composition for forming low refractive index layer, of isophorone diisocyanate was also added.

[Evaluation of Antireflective Film]

The antireflective film thus obtained was evaluated in the following items.

(1) Storage and Forced Deterioration Conditions for Sample (1-1) Standard Conditions The antireflective film constructed above was stored at 25° C. under 60% RH for 7 days.

(1-2) High-Humidity Storage Conditions

Each sample was stored at 60° C. under 90% RH for 2 days or 7 days.

(2) Cross Cut Evaluation Test on Adhesiveness

Each of the samples having been stored under the above conditions was subjected to a cross cut test in accordance with JIS K-5400. More specifically speaking, 11 notches were made at intervals of 1 mm on the antireflective layer side face of the sample to give 100 squares. Next, a cellulose adhesive tape was bonded to it and quickly peeled at an angle of 90°. Then the squares remaining without peeled were counted. A sample showing 90 or more remaining squares is referred to as practically usable.

(3) Surface Roughness

The average centerline surface roughness Ra of each of the samples having been stored under the above conditions was determined by the method specified in JIS B-0601.

(4) Measurement of Surface Free Energy

After conditioning each sample at 25° C. under 60% RH for 2 hours, contact angles to water and methylene iodide were measured and surface free energy (mJ/m$^2$) was calculated from the measurement values.

(5) Average Reflectivity

Using a spectrophotometer (manufactured by JASCO Corporation), spectral reflectivity at an incident angle of 5° was measured in a wavelength range of 380 to 780 nm. Then the average reflectivity at 450 nm to 650 nm was employed.

Examples 1-1 to 1-10 and Comparative Example 1-2

Construction of Antireflective Film Samples 102 to 112

Antireflective film samples 102 to 112 were constructed as in the construction of the antireflective film sample 101 in COMPARATIVE EXAMPLE 1-1 but using, as substitutes for the coating solution of composition for forming hard coat layer (A-1) and the coating solution of composition for forming low refractive index layer (C-1), each of the coating solutions of composition for forming hard coat layer and the coating solutions of composition for forming low refractive index layer as listed in TABLE 1.

Examples 1-11 to 1-13 and Comparative Example 1-3

Construction of Antireflective Film Samples 113 to 116

Antireflective film samples 113 to 116 were constructed as in the construction of the antireflective film sample 101 in COMPARATIVE EXAMPLE 1-1 but using, as substitutes for the coating solution of composition for forming hard coat layer (A-1) and the coating solution of composition for forming low refractive index layer (C-1), each of the coating solutions of composition for forming hard coat layer and the coating solutions of composition for forming low refractive index layer as listed in TABLE 1, and adjusting the hard coat layer thickness to 3.8 μm (the samples 113, 114 and 115) or 3.5 μm (the sample 116).

TABLE 1 summarizes the coating solutions of composition for forming hard coat layer and the coating solutions of composition for forming low refractive index layer employed and the evaluation results of the antireflective film samples 102 to 116.

TABLE 1

| | | Coating solution of composition for forming each layer | | | | | Cross cut evaluation of adhesiveness | | |
|---|---|---|---|---|---|---|---|---|---|
| | Sample no. | Hard coat layer no. | Low-refractive index layer no. | Mirror reflectivity (%) | Surface roughness (Ra) | Surface free energy (mJ/m$^2$) | Standard Conditions | High-humidity storage conditions 2 days | 7 days |
| C. Ex. 1-1 | 101 | A-1 | D-1 | 1.61 | 0.004 | 23 | 65 | 45 | 15 |
| C. Ex. 1-2 | 102 | A-2 | D-1 | 1.40 | 0.13 | 23 | 83 | 60 | 20 |
| Ex. 1-1 | 103 | A-2 | D-4 | 1.40 | 0.13 | 22 | 100 | 100 | 95 |
| Ex. 1-2 | 104 | A-3 | D-4 | 1.40 | 0.10 | 22 | 100 | 100 | 95 |
| Ex. 1-3 | 105 | A-4 | D-4 | 1.40 | 0.10 | 22 | 100 | 100 | 92 |
| Ex. 1-4 | 106 | A-5 | D-4 | 1.40 | 0.12 | 22 | 100 | 100 | 92 |
| Ex. 1-5 | 107 | B-1 | D-4 | 1.08 | 0.14 | 22 | 100 | 100 | 92 |
| Ex. 1-6 | 108 | C-1 | D-4 | 1.40 | 0.13 | 22 | 100 | 100 | 98 |
| Ex. 1-7 | 109 | C-2 | D-4 | 1.40 | 0.13 | 22 | 100 | 100 | 98 |
| Ex. 1-8 | 110 | A-2 | D-2 | 1.40 | 0.13 | 30 | 100 | 99 | 92 |
| Ex. 1-9 | 111 | B-1 | D-7 | 1.05 | 0.14 | 22 | 100 | 100 | 95 |
| Ex. 1-10 | 112 | B-1 | D-5 | 1.05 | 0.14 | 30 | 100 | 99 | 92 |
| Ex. 1-11 | 113 | A-2 | D-4 | 1.38 | 0.26 | 22 | 100 | 100 | 98 |
| Ex. 1-12 | 114 | A-4 | D-4 | 1.38 | 0.24 | 22 | 100 | 100 | 98 |
| Ex. 1-13 | 115 | B-1 | D-4 | 1.06 | 0.29 | 22 | 100 | 100 | 98 |
| C. Ex. 1-3 | 116 | A-2 | D-4 | 1.36 | 0.35 | 22 | 50 | 30 | 10 |

The results shown in TABLE 1 clearly indicate the following facts.

The antireflective film samples having the low refractive index layer satisfying the requirements according to the invention and also having the surface roughness satisfying the requirements according to the invention by using specific particles in the hard coat layer showed excellent cross cut adhesiveness even after storing under the high-humidity conditions {comparing the samples 101, 102 and 116 (COMPARATIVE EXAMPLES 1-1, 1-2 and 1-3) with the sample 103, 113 and 116 (EXAMPLES 1-1 and 1-11, COMPARATIVE EXAMPLE 1-3)}.

The antireflective film samples having surface energy falling within the preferable range as defined in the invention (due to, for example, use of a silicone compound) showed improved cross cut adhesiveness after storing under the high-humidity conditions {comparing the samples 110 (EXAMPLE 1-8; surface free energy being outside the range) with the sample 103 (EXAMPLE 1-1; inside), and the samples 112 (EXAMPLE 1-10; outside) with the sample 111 (EXAMPLES 1-9; inside)}.

Further, the antireflective film samples having a thixotropic agent added to the hard coat layer showed improved cross cut adhesiveness after storing under the high-humidity conditions {comparing the samples 103 (EXAMPLE 1-1; not added) with the sample 108 (EXAMPLE 1-6; added), and the samples 104 (EXAMPLE 1-2; not added) with the sample 109 (EXAMPLES 1-7; added)}.

Example 2

Construction of Antireflective Film

Comparative Example 2-1

Construction of Antireflective Film Sample 201

(1) Formation of Antistatic Layer

A triacetylcellulose film of 80 μm in thickness (FUJITAC TAC-TD80U, manufactured by FUJI PHOTOFILM Co., Ltd.) was unwound in a rolled state. Then the coating solution of composition for forming antistatic layer (AS-1) as described above was applied by using a microgravure roll (diameter: 50 mm) having a gravure pattern of a line density of 360 lines/in. and a depth of 40 μm and a doctor blade at a gravure roll rotation speed of 30 rpm and a conveying speed of 35 m/min. After drying at 80° C. for 120 seconds, the coating layer was hardened by irradiating under nitrogen-purge with ultraviolet light at 250 mJ/cm$^2$ by using an air-cool metal halide lamp (160 W/cm, manufactured by EYE-GRAPHICS Co., Ltd.) at an illuminance of 200 mW/cm$^2$. Thus an antistatic layer of 1.0 μm in thickness was formed followed by winding.

On the antistatic layer as described above, the coating solution of composition for forming hard coat layer (A-1) and a coating solution of composition for forming low refractive index layer {containing 1% by weight of isophorone diisocyanate based on the solid matters contained in (D-1)} were successively applied and photohardened in accordance with EXAMPLE 1 to thereby give an antireflective film sample 201. The hard coat layer thickness and the low refractive index layer thickness were controlled respectively to 4.3 μm and 95 nm after photohardening. In constructing antireflective films other than the sample 201, 1% by weight, based on the solid matters in each coating solution of composition for forming low refractive index layer, of isophorone diisocyanate was also added.

Examples 2-1 to 2-20 and Comparative Examples 2-2 to 2-4

Construction of Antireflective Film Samples 202 to 224

Antireflective film samples 202 to 224 were constructed as in the construction of the antireflective film sample 201 in COMPARATIVE EXAMPLE 2-1 but altering the coating solution of composition for forming hard coat layer and the coating solution of composition for forming low refractive index layer as shown in TABLE 2.

In the antireflective film samples 216 to 224, a triacetylcellulose film of 80 μm in thickness (FUJITAC TAC-TD80U, manufactured by FUJI PHOTOFILM Co., Ltd.) was subjected, without applying the coating solution of composition for forming antistatic layer (AS-1), to the application of the coating solution of composition for forming hard coat layer and the subsequent steps. In the sample 215, a hard coat layer, an antistatic layer and a low refractive index layer were formed in this order form the substrate side and the thickness of the antistatic layer was adjusted to 100 nm.

The surface roughness of each of the obtained antireflective films was measured as in EXAMPLE 1. Further, the following tests were carried out. TABLE 2 summarizes the coating solutions of composition for forming each layer employed and the evaluation results of the antireflective film samples 201 to 224.

(1) Storage and Forced Deterioration Conditions for Sample (1-1) Standard Conditions The same conditions as in EXAMPLE 1 and COMPARATIVE EXAMPLE 1 were employed.

(1-3) Heat Cycle Conditions

For each sample, cooling (−40° C.)/heating (+90° C.) was performed for 100 or 200 cycles while each cycle comprising 30 minutes.

(6) Scratch Resistance Evaluation by Rubbing with Steel Wool

By using a rubbing tester, a rubbing test was carried out under the following conditions.

Environment for evaluation: 25° C., 60% RH.

Rubbing material: Steel wool "No. 000" (manufactured by NIHON STEEL WOOL K.K.) was wound around the edge (1 cm×1 cm) of a tester being in contact with a sample and fixed with a band.

Rubbing distance (one way): 13 cm.

Rubbing speed: 13 cm/sec.

Load: 500 g/cm$^2$.

Contact area at edge: 1 cm×1 cm.

Rubbing number: 10 reciprocations.

After the completion of the rubbing, the back face of the sample was painted with a black oily ink and observed with the naked eye under reflected light. Then scratch marks in the rubbed part were evaluated in accordance with the following criteria.

A: No mark was visible even in very careful observation.

B: Slight marks were visible in very careful observation.

C: Slight marks were visible.

D: Moderate marks were visible.

E: Marks were found at first sight.

(7) Measurement of logSR (Surface Resistance)

After conditioning at 25° C. under 60% RH for 2 hours, the surface resistance (SR) was measured by the circular electrode method. By determining the common logarithm of SR, logSR was calculated.

TABLE 2

| | Sample no. | Coating solution of composition for forming each layer (no.) | | | Mirror reflectivity (%) | Surface roughness (Ra) | Surface resistance (logSR) | Steel wool-rubbing resistance | | |
|---|---|---|---|---|---|---|---|---|---|---|
| | | Antistatic layer | Hard coat layer | Low refractive index layer | | | | Standard conditions | Heat cycle After 100 cycles | After 200 cycles |
| C. Ex. 2-1 | 201 | AS-1 | A-1 | D-1 | 1.61 | 0.004 | 10.6 | E | E | E |
| C. Ex. 2-2 | 202 | AS-1 | A-2 | D-1 | 1.40 | 0.11 | 10.6 | E | E | E |
| Ex. 2-1 | 203 | AS-1 | A-2 | D-3 | 1.40 | 0.11 | 10.6 | A | B | C |
| Ex. 2-2 | 204 | AS-1 | A-2 | D-4 | 1.40 | 0.11 | 10.6 | A | A | B |
| Ex. 2-3 | 205 | AS-1 | A-2 | E-1 | 1.15 | 0.11 | 10.6 | A | A | A |
| Ex. 2-4 | 206 | AS-1 | A-2 | E-2 | 1.02 | 0.11 | 10.6 | A | A | A |
| Ex. 2-5 | 207 | AS-1 | A-2 | D-6 | 1.40 | 0.11 | 10.6 | A | B | C |
| Ex. 2-6 | 208 | AS-1 | A-2 | D-7 | 1.40 | 0.11 | 10.6 | A | A | B |
| Ex. 2-7 | 209 | AS-1 | A-2 | E-3 | 1.02 | 0.11 | 10.6 | A | A | A |
| Ex. 2-8 | 210 | AS-1 | C-2 | E-1 | 1.15 | 0.11 | 10.6 | A | A | A |
| Ex. 2-9 | 211 | AS-1 | C-1 | E-3 | 1.02 | 0.11 | 10.6 | A | A | A |
| Ex. 2-10 | 212 | AS-2 | A-2 | D-4 | 1.40 | 0.11 | 10.9 | A | A | B |
| Ex. 2-11 | 213 | AS-2 | A-2 | E-1 | 1.15 | 0.11 | 10.9 | A | A | A |
| Ex. 2-12 | 214 | AS-1 | C-3 | E-1 | 1.15 | 0.11 | 9.4 | A | A | A |
| Ex. 2-13 | 215 | AS-1 | A-2 | E-1 | 1.15 | 0.11 | 9.3 | A | A | A |
| C. Ex. 2-3 | 216 | — | A-1 | D-1 | 1.61 | 0.004 | 13.5 | E | E | E |
| C. Ex. 2-4 | 217 | — | A-4 | D-1 | 1.40 | 0.08 | 13.5 | D | E | E |
| Ex. 2-14 | 218 | — | A-4 | D-3 | 1.40 | 0.08 | 13.5 | A | B | C |
| Ex. 2-15 | 219 | — | A-4 | D-4 | 1.40 | 0.08 | 13.5 | A | A | B |
| Ex. 2-16 | 220 | — | A-4 | E-1 | 1.15 | 0.08 | 13.5 | A | A | A |
| Ex. 2-17 | 221 | — | A-4 | E-2 | 1.02 | 0.08 | 13.5 | A | A | A |
| Ex. 2-18 | 222 | — | A-4 | D-6 | 1.40 | 0.08 | 13.5 | A | B | C |
| Ex. 2-19 | 223 | — | A-4 | D-7 | 1.40 | 0.08 | 13.5 | A | A | B |
| Ex. 2-20 | 224 | — | A-4 | E-3 | 1.02 | 0.08 | 13.5 | A | A | A |

The results shown in TABLE 2 clearly indicate the following facts.

The samples having the low refractive index layer satisfying the requirements for the antireflective film according to the invention and also having the surface roughness satisfying the requirements according to the invention by using specific particles in the hard coat layer showed excellent tolerance against the rubbing with steel wool both before and after subjecting to the heat cycle {comparing the samples 201 and 202 (COMPARATIVE EXAMPLES 2-1 and 2-2) with the samples 203 to 209 (EXAMPLES 2-1 to 2-7), and the samples 216 and 217 (COMPARATIVE EXAMPLES 2-3 and 24) with the samples 218 to 224 (EXAMPLES 2-14 to 2-20)}.

Further, the samples having the hollow particles in the low refractive index layer showed excellent tolerance against the rubbing with steel wool after the heat cycle {comparing the sample 219 (EXAMPLE 2-15; containing no hollow particle) with the samples 220 and 221 (EXAMPLES 2-16 and 2-17; containing hollow particles; the sample 223 (EXAMPLE 2-19; no) with the sample 224 (EXAMPLE 2-20; containing); the sample 201 (EXAMPLE 2-2; no) and the samples 205 and 206 (EXAMPLES 2-3 and 2-4; containing); and the example 208 (EXAMPLE 2-6) with the sample 209 (EXAMPLE 2-7)}.

Moreover, it is understood that a sample having an antistatic layer formed therein showed a lowered surface resistance of the film, namely, being excellent in charge properties. In particular, the sample 214 containing gold/nickel-coated particles in the hard coat layer (EXAMPLE 2-12) and the sample 215 having an antistatic layer immediately below the low refractive index layer (EXAMPLE 2-13) showed large lowerings in surface resistance.

Example 3

Preparation of Coating Solution of Composition for Forming Low Refractive Index Layer (F-1)

2000 g of tetraethoxysilane, 200 g of isobutanol and 6 g of aluminum acetylacetonate were fed into a flask and stirred. Next, 500 g of a 0.25 mol/L aqueous solution of acetic acid was dropped in portions. After the completion of the addition, the mixture was stirred at room temperature for 3 hours. Then 600 g of diacetone alcohol was added and the mixture was filtered through a polypropylene filter having a pore size of 1 µm to give a coating solution of composition for forming low refractive index layer (F-1).

{Preparation of Coating Solution of Composition for Forming Low Refractive Index Layer (F-2)}

160 g of a perfluoropolyether group-containing silane compound represented by $C_3F_7$—$(OC_3F_6)_{24}$—O—$(CF_2)_2$—$C_2H_4$—O—$CH_2Si(OCH_3)_3$, 1840 g of tetraethoxysilane, 200 g of isobutanol and 6 g of aluminum acetylacetonate were fed into a flask and stirred. Next, 500 g of a 0.25 mol/L aqueous solution of acetic acid was dropped in portions. After the completion of the addition, the mixture was stirred at room temperature for 3 hours. Then 600 g of diacetone alcohol was added and the mixture was filtered through a polypropylene filter having a pore size of 1 µm to give a coating solution of composition for forming low refractive index layer (F-2).

{Preparation of Coating Solution of Composition for Forming Antifouling Layer (G-1)}

A coating solution was prepared by diluting a perfluoropolyether group-containing silane compound represented by $C_3F_7$—$(OC_3F_6)_{24}$—O—$(CF_2)_2$—$C_2H_4$—O—$CH_2Si(OCH_3)_3$ with perfluorohexane to give a concentration of 9.5% by weight.

{Preparation of Coating Solution of Composition for Forming Antifouling Layer (G-2)}

A coating solution was prepared by diluting tridecafluorooctyltrimethoxysilane with isopropyl alcohol to give a concentration of 6.0%.

Example 3-1

Construction of Antireflective Film Sample 301

A sample 301 was prepared as in the construction of the antireflective film sample 101 in the above COMPARATIVE EXAMPLE 1-1 but using the coating solution of composition for forming hard coat layer (A-3) and the coating solution of composition for forming low refractive index layer (F-1) respectively as substitutes for the coating solution of composition for forming hard coat layer (A-1) and the coating solution of composition for forming low refractive index layer (D-1).

Example 3-2

Construction of Antireflective Film Sample 302

An antireflective film sample 302 was constructed by applying the coating solution of composition for forming antifouling layer (G-1) on the low refractive index layer of the antireflective film sample 301 constructed above and drying at 120° C. for 1 minute to form an antifouling layer of 8 nm in thickness.

Example 3-3

Construction of Antireflective Film Sample 303

An antireflective film sample 303 was prepared as in the construction of the antireflective film sample 302 but using the coating solution of composition for forming antifouling (G-2) as a substitute for the coating solution of composition for forming antifouling layer (G-1).

Example 3-4

Construction of Antireflective Film Sample 304

An antireflective film sample 304 was prepared as in the construction of the antireflective film sample 301 but using the coating solution of composition for forming low refractive index layer (F-2) as a substitute for the coating solution of composition for forming low refractive index layer (F-1).

The antireflective film samples 301 to 304 thus obtained were evaluated by the cross cut adhesiveness test before and after storing at high humidity. TABLE 3 shows the results.

Thus, it can be understood that the antireflective film films according to the invention of EXAMPLES 3 having antifouling layer showed further elevated layer strength durabilities.

Example 4

The following antireflective film samples 401 to 403 were constructed by using the coating solution of composition for forming hard coat layer (C-1) and the coating solution of composition for forming low refractive index layer (D-4) which are the same as those employed in the antireflective film sample 108 of EXAMPLE 1.

Example 4-1

Construction of Antireflective Film Sample 401

After the completion of the application of both of the hard coat layer and the low refractive index layer and photohardening, the sample was saponified in accordance with the following procedure (1).

(1) After dipping in a 1.5 mol/L aqueous NaOH solution at 55° C. for 120 seconds, the sample was neutralized by further dipping in a 0.05 mol/L aqueous $H_2SO_4$ solution at 30° C. for 20 seconds, washed with water for 20 seconds and then dried at 120° C. for 2 minutes.

Example 4-2

Construction of Antireflective Film Sample 402

After forming the hard coat layer, the sample was saponified in accordance with the following procedure (2) and then the coating solution of composition for forming low refractive index layer was applied.

(2) After dipping in a 1.5 mol/L aqueous NaOH solution at 55° C. for 120 seconds, the sample was neutralized by further dipping in a 0.05 mol/L aqueous $H_2SO_4$ solution at 30° C. for 20 seconds, washed with water for 20 seconds and then dried at 120° C. for 2 minutes. Next, the low refractive index layer was formed.

Example 4-3

Construction of Antireflective Film Sample 403

After the completion of the application of both of the hard coat layer and the low refractive index layer and photohardening, the sample was saponified in accordance with the following procedure (3).

TABLE 3

| | Coating solution of composition for forming each layer(no.) | | | Mirror reflectivity (%) | Surface roughness (Ra) | Surface free energy (mJ/m$^2$) | Cross cut evaluation of adhesiveness | | |
|---|---|---|---|---|---|---|---|---|---|
| | | | | | | | Standard conditions | High-humidity storage conditions | |
| Sample no. | Hard coat layer | Low-refractive index layer | Antifouling layer | | | | | 2 days | 7 days |
| Ex. 3-1 | 301 | A-3 | F-1 | — | 1.41 | 0.10 | 38 | 96 | 93 | 85 |
| Ex. 3-2 | 302 | A-3 | F-1 | G-1 | 1.40 | 0.10 | 22 | 100 | 100 | 98 |
| Ex. 3-3 | 303 | A-3 | F-1 | G-2 | 1.40 | 0.10 | 22 | 100 | 100 | 98 |
| Ex. 3-4 | 304 | A-3 | F-2 | — | 1.40 | 0.10 | 23 | 100 | 100 | 94 |

(3) A protective masking film (a PET film having a slightly adhesive layer) was laminated on the face of the sample on which the low refractive index layer had been formed and then the saponification treatment was carried out under the same conditions as in the above (1). After the completion of the saponification, the laminated film was peeled off and the sample was evaluated as follows.

TABLE 4 shows the results of the cross cut evaluation of adhesiveness after the heat cycling as in EXAMPLE 1.

TABLE 4

| | | Coating solution of composition for forming each layer (no.) | | | Mirror reflectivity (%) | Surface roughness (Ra) | Surface free energy (mJ/m$^2$) | Cross cut evaluation of adhesiveness | | |
|---|---|---|---|---|---|---|---|---|---|---|
| | Sample no. | Hard coat layer | Low refractive index layer | Saponification conditions | | | | Standard conditions | High-humidity storage conditions | |
| | | | | | | | | | 2 days | 7 days |
| Ex. 4-1 | 401 | C-1 | D-4 | (1) | 1.40 | 0.10 | 38 | 98 | 83 | 61 |
| Ex. 4-2 | 402 | C-1 | D-4 | (2) | 1.40 | 0.10 | 22 | 100 | 100 | 100 |
| Ex. 4-3 | 403 | C-1 | D-4 | (3) | 1.40 | 0.10 | 22 | 100 | 98 | 93 |

According to TABLE 4, it can be understood that the interlayer adhesiveness of the film can be further improved by saponifying the sample with an alkali before the formation of the low refractive index layer. Although the reason for the improvement in the interlayer adhesiveness owing to the alkali saponification is not sufficiently clarified, it is assumed that the surface polarity of the hard coat layer is elevated by the saponification and thus its adhesiveness to the low refractive index material employed in the invention is improved.

Example 5

Construction of Polarizing Plate

A triacetylcellulose film of 80 μm in thickness (FUJITAC TAC-TD80U, manufactured by FUJI PHOTOFILM Co., Ltd.) was dipped in a 1.5 mol/L aqueous NaOH solution at 55° C. for 2 minutes and then neutralized and washed with water. The film thus obtained and a triacetylcellulose film having been saponified in the back face of the antireflective film sample of EXAMPLE 1 or 2 were boned to both faces of a polarizing layer constructed by allowing polyvinyl alcohol to adsorb iodine and stretching, thereby constructing a polarizing plate.

[Liquid Crystal Display Unit]

The polarizing plate in the visible side of a liquid crystal display unit (provided with a polarizing separation film having a polarizing selection layer "D-BEF" manufactured by SUMITOMO 3M Ltd. between a backlight and a liquid crystal cell) of a notebook-size personal computer having a transmission type TN liquid crystal display unit was replaced by the polarizing plate constructed above so that the antireflective film side was located as the outermost face. As a result, a high-definition display unit suffering from little reflection of outside light or background could be obtained.

Example 6

Construction of Polarizing Plate

[Construction of Triacetylcellulose Film]

By using the following substrates, polarizing plates were constructed.

Substrate 1: A triacetylcellulose film constructed in accordance with EXAMPLE 1 in JP-A-2001-249223.
Substrate 2: A triacetylcellulose film constructed in accordance with EXAMPLE 2 in JP-A-2001-249223.
Substrate 3: A triacetylcellulose film constructed in accordance with EXAMPLE 2 in JP-A-2003-170492.
Substrate 4: A triacetylcellulose film of 80 μm in thickness "FUJITAC TAC-TD80U" (manufactured by FUJI PHOTO-FILM Co., Ltd.).

The retardation values of these substrates are as follows.
Substrate 1: Re=40 nm, Rth=130 nm
Substrate 2: Re=50 nm, Rth=240 nm
Substrate 3: Re=64 nm, Rth=120 nm
Substrate 4: Re=4 nm, Rth=45 nm Examples 6-1 to 6-8

Construction of Polarizing Plate (P-1)

A polarizing layer (PF-1) was constructed by stretching a polyvinyl alcohol film and allowing it to adsorb iodine. First, the marketed triacetylcellulose film (the substrate 4) was saponified and bonded to one side of the polarizing layer (PF-1) with the use of a polyvinyl-based adhesive. Next, the substrate 1 was saponified and bonded to the other side of the polarizing layer (PF-1) with the use of a polyvinyl-based adhesive. In this step, the transmission axis of the polarizing layer (PF-1) and the slow axis of the substrate 1 was located in parallel while the transmission axis of the polarizing layer (PF-1) and the slow axis of the marketed triacetylcellulose film (the substrate 4) were located orthogonally to each other. The polarizing plate thus constructed was referred to P-1.

[Construction of Polarizing Plate (P-2)]

A polarizing plate (P-2) was constructed as in the construction of the polarizing plate (P-1) as described above but using the substrate 2 as a substitute for the substrate 1.

[Construction of Polarizing Plate (P-3)]

A polarizing plate (P-3) was constructed as in the construction of the polarizing plate (P-1) as described above but using the substrate 3 as a substitute for the substrate 1.

[Construction of Polarizing Plate (P-4)]

A polarizing plate (P-4) was constructed as in the construction of the polarizing plate (P-1) as described above but using the substrate 2 as a substitute for the substrate 1.

[Construction of Polarizing Plate (P-1A)]

A polarizing plate (P-1A) was constructed as in the construction of the polarizing plate (P-1) as described above but using the antireflective film sample 214 in EXAMPLE 2 as a substitute for the substrate 4.

[Construction of Polarizing Plate (P-2A)]

A polarizing plate (P-2A) was constructed as in the construction of the polarizing plate (P-2) as described above but using the antireflective film sample 214 in EXAMPLE 2 as a substitute for the substrate 4.

[Construction of Polarizing Plate (P-3A)]

A polarizing plate (P-3A) was constructed as in the construction of the polarizing plate (P-3) as described above but using the antireflective film sample 214 in EXAMPLE 2 as a substitute for the substrate 4.

[Construction of Polarizing Plate (P-4A)]

A polarizing plate (P-4A) was constructed as in the construction of the polarizing plate (P-1A) as described above but using the substrate 4 as a substitute for the substrate 1.

[Liquid Crystal Display Unit]

A pair of polarizing plates and a pair of optically compensatory sheets were stripped off from a liquid crystal display device with the use of a liquid crystal cell the vertical alignment type "VL-1530S" (manufactured by FUJITSU Ltd.). As substitutes therefor, two polarizing plates constructed in EXAMPLE 6 were bonded with the use of a pressure-sensitive adhesive, i.e., one in the observer side and one in the backlight side, as shown in TABLE 5. The polarizing plates were in the cross Nicols arrangement with the transmission axis of the polarizing plate in the observer side being vertical and the transmission axis of the polarizing plate in the backlight side being horizontal. TABLE 5 shows the constitution. An image was displayed on the liquid crystal display unit thus constructed and reflection of outside light or background, viewing angle and dazzling were sensorily evaluated.

zling and enlarged viewing angles compared with the corresponding units A, C, E and G (COMPARATIVE EXAMPLES 7-1 to 7-4) having no antireflective film according to the invention.

It is also understood that the display units B, D and F having the antireflective film according to the invention and having retardation value of at least one of the protective films constituting the polarizing plate falling within the ranges as specified in the invention showed particularly enlarged viewing angles and extremely high visibility.

Example 8

Organic EL Display Unit

The antireflective film samples of EXAMPLES 1 and 2 were bonded to the surface of an organic EL display unit with the use of a pressure-sensitive adhesive. As a result, reflection on the glass surface could be regulated and thus a display unit having high visibility could be obtained.

Example 9

Construction of Antireflective Film

{Preparation of Coating Solution of Composition for Forming Low Refractive Index Layer (H-1)}

To 100 g of the coating solution of composition for forming low refractive index layer (D-2) as described above was added

TABLE 5

| | C. Ex. 7-1 Unit A | Ex. 7-1 Unit B | C. Ex. 7-2 Unit C | Ex. 7-2 Unit D | C. Ex. 7-3 Unit E | Ex. 7-3 Unit F | C. Ex. 7-4 Unit G | Ex. 7-4 Unit H |
|---|---|---|---|---|---|---|---|---|
| Observer side | | | | | | | | |
| Polarizing plate | P-1 | P-1A | P-2 | P-2A | P-3 | P-3A | P-4 | P-4A |
| Protective film | Substrate 4 | Sample 214 | Substrate 4 | Sample 214 | Substrate 4 | Sample 214 | Substrate 4 | Sample 214 |
| Polarizing layer | PF-1 | PF-1 | PF-1 | PF-1 | PF-1 | PF-1 | PF-1 | PF-1 |
| Protective film | Substrate 1 | Substrate 1 | Substrate 2 | Substrate 2 | Substrate 3 | Substrate 3 | Substrate 4 | Substrate 4 |
| Liquid crystal cell | | | | | | | | |
| Polarizing plate | P-1 | P-1 | P-4 | P-4 | P-3 | P-3 | P-4 | P-4 |
| Protective film | Substrate 1 | Substrate 1 | Substrate 4 | Substrate 4 | Substrate 3 | Substrate 3 | Substrate 4 | Substrate 4 |
| Polarizing layer | PF-1 | PF-1 | PF-1 | PF-1 | PF-1 | PF-1 | PF-1 | PF-1 |
| Protective film | Substrate 4 | Substrate 4 | Substrate 4 | Substrate 4 | Substrate 4 | Substrate 4 | Substrate 4 | Substrate 4 |
| Backlight side | | | | | | | | |
| Polarizing plate combination | Z type | Y type | Z type | Y type | Z type | Y type | Z type | Z type |

Among the units listed in TABLE 5, the units B (EXAMPLE 7-1), D (EXAMPLE 7-2), F (EXAMPLE 7-3) and H (EXAMPLE 74) have the antireflective film according to the invention.

The units B, D and F have the antireflective film according to the invention and have the retardation value of at least one of the protective films constituting the polarizing plate falling within the ranges as specified in the invention (i.e., Re retardation value being at least 20 but not more than 70 nm and the Rth retardation value being at least 70 but not more than 400 nm). These units are indicated as "Y type" in the column "Polarizing plate combination" while other units are indicated as "Z type".

As a result, it was observed that the units B, D, F and H (EXAMPLES 7-1 to 74) with the use of the antireflective films according to the invention showed low reflectivities, lessened reflection of outside light or background, no daz- 147 g of a hollow silica dispersion "CS60-IPA" (particle size 60 nm, shell thickness 10 nm, refractive index 1.31, solid concentration 20%, main solvent isopropyl alcohol, manufactured by CATALYSTS AND CHEMICALS IND. Co., Ltd.) and the resulting mixture was stirred to thereby give a coating solution of composition for forming low refractive index layer (H-1).

{Preparation of Coating Solution of Composition for Forming Low Refractive Index Layer (H-2)}

To the coating solution of composition for forming low refractive index layer (H-1) as described above was further added 1.5% by weight, based on the solid contents in the coating solution (H-1), of isophorone diisocyanate to thereby give a coating solution of composition for forming low refractive index layer (H-2).

{Preparation of Coating Solution of Composition for Forming Low Refractive Index Layer (H-3)}

To the coating solution of composition for forming low refractive index layer (H-1) as described above was further added 5 g of a silane coupling agent "KBM-5103" (3-acryloxypropyltrimethoxysilane, manufactured by SHIN-ETSU CHEMICAL Co., Ltd.) to thereby give a coating solution of composition for forming low refractive index layer (H-3).

{Preparation of Coating Solution of Composition for Forming Low Refractive Index Layer (H-4)}

To 100 g of the coating solution of composition for forming low refractive index layer (F-1) of EXAMPLE 3 was added 147 g of a hollow silica dispersion "CS60-IPA" (particle size 60 nm, shell thickness 10 nm, refractive index 1.31, solid concentration 20%, main solvent isopropyl alcohol, manufactured by CATALYSTS AND CHEMICALS IND. Co., Ltd.). Further, 5 g of a silane coupling agent "KBM-5103" (3-acryloxypropyltrimethoxysilane, manufactured by SHIN-ETSU CHEMICAL Co., Ltd.) was added thereto to thereby give a coating solution of composition for forming low refractive index layer (H-4).

{Preparation of Coating Solution of Composition for Forming Hard Coat Layer (J-1)}

To 95.5 g of the coating solution of composition for forming hard coat layer (A-1) of EXAMPLE 1 was added 90 g of a 30% toluene dispersion of silica particles "SEAHOSTAR KE-P150" (refractive index 1.46, manufactured by NIPPON SHOKUBAI) having an average particle size of 1.5 μm dispersed in a Polytron dispersing machine at 10000 rpm for 30 minutes. The obtained liquid mixture was mixed by stirring to give a coating solution of composition for forming hard coat layer (J-1).

{Preparation of Coating Solution of Composition for Forming Hard Coat Layer (J-2)}

A coating solution of composition for forming hard coat layer (J-2) was prepared as in the preparation of the coating solution of composition for forming hard coat layer (J-1) as described above but adding 1 part by weight of organic clay per 100 parts of the solid matters contained in the coating solution (J-1).

{Preparation of Coating Solution of Composition for Forming Hard Coat Layer (J-3)}

A coating solution of composition for forming hard coat layer (J-3) was prepared as in the preparation of the coating solution of composition for forming hard coat layer (J-1) as described above but adding 1 part by weight of fine silica particles "AEROSIL 200" (average primary particle size 12 nm, refractive index 1.46, manufactured by NIPPON AEROSIL) per 100 parts of the solid matters contained in the coating solution (J-1).

{Preparation of Coating Solution of Composition for Forming Hard Coat Layer (J-4)}

A coating solution of composition for forming hard coat layer (J-4) was prepared as in the preparation of the coating solution of composition for forming hard coat layer (J-1) as described above but adding 1.5 parts by weight of acetylpropionylcellulose per 100 parts of the solid matters contained in the coating solution (J-1).

{Preparation of Coating Solution of Composition for Forming Hard Coat Layer (J-5)}

A coating solution of composition for forming hard coat layer (J-5) was prepared as in the preparation of the coating solution of composition for forming hard coat layer (J-1) as described above but adding 2.5 parts by weight of acetylpropionylcellulose per 100 parts of the solid matters contained in the coating solution (J-1).

{Preparation of Coating Solution of Composition for Forming Hard Coat Layer (J-6)}

A coating solution of composition for forming hard coat layer (J-6) was prepared as in the preparation of the coating solution of composition for forming hard coat layer (J-1) as described above but adding 15 parts by weight of a silane coupling agent "KBM-5103" (3-acryloxypropyltrimethoxysilane, manufactured by SHIN-ETSU CHEMICAL Co., Ltd.) per 100 parts of the solid matters contained in the coating solution (J-1).

{Preparation of Coating Solution of Composition for Forming Hard Coat Layer (J-7)}

A coating solution of composition for forming hard coat layer (J-7) was prepared as in the preparation of the coating solution of composition for forming hard coat layer (J-1) as described above but adding 35 parts by weight of the following sol solution a per 100 parts of the solid matters contained in the coating solution (J-1).

(Preparation of Sol Solution A)

120 parts by weight of methyl ethyl ketone, 100 parts by weight of a silane coupling agent "KBM-5103" (3-acryloxypropyltrimethoxysilane, manufactured by SHIN-ETSU CHEMICAL Co., Ltd.) and 3 parts by weight of diisopropoxyaluminum ethyl acetoacetate ("CHELOPE EP-12" manufactured by Hope Chemical Co., Ltd.) were introduced into a reactor provided with a stirrer and a reflux condenser and stirred. Next, 20 parts by weight of ion-exchanged water was added. After reacting at 60° C. for 4 hours, the reaction mixture was cooled to room temperature to give a sol solution a. It had a mass-weight average molecular weight of 1600 and components of from 1000 to 20000 in molecular weight amounted to 100% of the oligomer components and higher. When analyzed by gas chromatography, it was found out that no starting acryloxypropyltrimethoxysilane remained therein.

{Preparation of Coating Solution of Composition for Forming Hard Coat Layer (J-8)}

A coating solution of composition for forming hard coat layer (J-8) was prepared as in the preparation of the coating solution of composition for forming hard coat layer (J-1) as described above but adding 20 g of the coating solution of composition for forming low refractive index layer (F-1) of EXAMPLE 3 per 100 g of the solid matters contained in the coating solution (J-1).

{Preparation of Coating Solution of Composition for Forming Hard Coat Layer (J-9)}

A coating solution of composition for forming hard coat layer (J-9) was prepared as in the preparation of the coating solution of composition for forming hard coat layer (J-1) as described above but adding 15 g of a silane coupling agent "KBM-403" (3-glycidoxypropyltriethoxysilane, manufactured by SHIN-ETSU CHEMICAL Co., Ltd.) per 100 g of the solid matters contained in the coating solution (J-1).

{Preparation of Coating Solution of Composition for Forming Hard Coat Layer (J-10)}

A coating solution of composition for forming hard coat layer (J-10) was prepared as in the preparation of the coating solution of composition for forming hard coat layer (J-4) as described above but adding 15 g of a silane coupling agent "KBM-5103" (3-acryloxypropyltriethoxysilane, manufactured by SHIN-ETSU CHEMICAL Co., Ltd.) per 100 g of the solid matters contained in the coating solution (J-4).

{Preparation of Coating Solution of Composition for Forming Hard Coat Layer (J-11)}

A coating solution of composition for forming hard coat layer (J-11) was prepared as in the preparation of the coating solution of composition for forming hard coat layer (J4) as described above but adding 1.5% by weight of isophorone diisocyanate per 100 g of the solid matters contained in the coating solution (J-4).

{Preparation of Coating Solution of Composition for Forming Hard Coat Layer (J-12)}

285 g of a marketed zirconia-containing UV-hardening hard coat solution "DESOLITE Z7404" (manufactured by JSR, solid content about 61%, $ZrO_2$ content in solid matters about 70%, containing polymerizable monomer and polymerization initiator) was mixed with 85 g of a mixture of dipentaerythritol pentaacrylate with dipentaerythritol hexaacrylate "DPHA" (manufactured by NIPPON KAYAKU Co., Ltd.) and the obtained mixture was diluted with 60 g of methyl isobutyl ketone and 17 g of methyl ethyl ketone. After further adding 28 g of a silane coupling agent "KBM-5103" (manufactured by SHIN-ETSU CHEMICAL Co., Ltd.), the resultant mixture was mixed by stirring. The solution was applied and UV-hardened. The coating thus obtained had a refractive index of 1.61.

To this solution was added 90 g of a 30% methyl ethyl ketone dispersion of silica particles "SEAHOSTAR KE-P150" (refractive index 1.46, manufactured by NIPPON SHOKUBAI) having an average particle size of 1.5 μm dispersed in a Polytron dispersing machine at 10000 rpm for 30 minutes. The obtained liquid mixture was mixed by stirring and 0.75 g of the above-described fluorine-based surface modifier (FP-1) was finally added thereto. The obtained liquid mixture was filtered through a polypropylene filter having a pore size of 30 μm to give a coating solution of composition for forming hard coat layer (J-12).

{Preparation of Coating Solution of Composition for Forming Antistatic Layer (AS-3)}

To 100 parts by weight of "SNS-10M" (manufactured by ISHIHARA SANKYO K.K., ATO 19.7% by weight, dispersant 10.7% by weight, solvent methyl ethyl ketone) were added 15.0 parts by weight of a mixture of dipentaerythritol pentaacrylate with dipentaerythritol hexaacrylate "DPHA" (manufactured by NIPPON KAYAKU Co., Ltd.), 1.5 parts by weight of a silane coupling agent "KBM-5103" (3-acryloxypropyltrimethoxysilane, manufactured by SHIN-ETSU CHEMICAL Co., Ltd.), 1.0 part by weight a photo radical generation agent "Irgacure 907" (manufactured by Ciba Specialty Chemicals) and 30 parts by weight of methoxypropanol. Then the resultant mixture was diluted with methyl ethyl ketone to give a solid concentration of 10% by weight. Thus, a coating solution of composition for forming antistatic layer (AS-3) was prepared.

{Preparation of Coating Solution of Composition for Forming Antistatic Layer (AS-4)}

To 100 parts by weight of "SNS-10M" (manufactured by ISHIHARA SANKYO K.K., ATO 19.7% by weight, dispersant 10.7% by weight, solvent methyl ethyl ketone) were added 10.0 parts by weight of a mixture of dipentaerythritol pentaacrylate with dipentaerythritol hexaacrylate "DPHA" (manufactured by NIPPON KAYAKU Co., Ltd.), 1.5 parts by weight of a silane coupling agent "KBM-5103" (3-acryloxypropyltrimethoxysilane, manufactured by SHIN-ETSU CHEMICAL Co., Ltd.), 1.0 part by weight a photo radical generating agent "Irgacure 907" (manufactured by Ciba Specialty Chemicals) and 30 parts by weight of methoxypropanol. Then the resultant mixture was diluted with methyl ethyl ketone to give a solid concentration of 10% by weight. Thus, a coating solution of composition for forming antistatic layer (AS-4) was prepared.

{Preparation of Coating Solution of Composition for Forming Antistatic Layer (AS-5)}

To 100 parts by weight of "SNS-10M" (manufactured by ISHIHARA SANKYO K.K., ATO 19.7% by weight, dispersant 10.7% by weight, solvent methyl ethyl ketone) were added 5.0 parts by weight of a mixture of dipentaerythritol pentaacrylate with dipentaerythritol hexaacrylate "DPHA" (manufactured by NIPPON KAYAKU Co., Ltd.), 1.5 parts by weight of a silane coupling agent "KBM-5103" (3-acryloxypropyltrimethoxysilane, manufactured by SHIN-ETSU CHEMICAL Co., Ltd.), 0.7 part by weight a photo radical generating agent "Irgacure 907" (manufactured by Ciba Specialty Chemicals) and 30 parts by weight of methoxypropanol. Then the resultant mixture was diluted with methyl ethyl ketone to give a solid concentration of 10% by weight. Thus, a coating solution of composition for forming antistatic layer (AS-5) was prepared.

{Preparation of Coating Solution of Composition for Forming Antistatic Layer (AS-6)}

To 100 parts by weight of "SNS-10M" (manufactured by ISHIHARA SANKYO K.K., ATO 19.7% by weight, dispersant 10.7% by weight, solvent methyl ethyl ketone) were added 2.0 parts by weight of a mixture of dipentaerythritol pentaacrylate with dipentaerythritol hexaacrylate "DPHA" (manufactured by NIPPON KAYAKU Co., Ltd.), 1.5 parts by weight of a silane coupling agent "KBM-5103" (3-acryloxypropyltrimethoxysilane, manufactured by SHIN-ETSU CHEMICAL Co., Ltd.), 0.4 part by weight a photo radical generating agent "Irgacure 907" (manufactured by Ciba Specialty Chemicals) and 30 parts by weight of methoxypropanol. Then the resultant mixture was diluted with methyl ethyl ketone to give a solid concentration of 10% by weight. Thus, a coating solution of composition for forming antistatic layer (AS-6) was prepared.

{Preparation of Coating Solution of Composition for Forming Antistatic Layer (AS-7)}

To 100 parts by weight of "SNS-10M" (manufactured by ISHIHARA SANKYO K.K., ATO 19.7% by weight, dispersant 10.7% by weight, solvent methyl ethyl ketone) were added 1.0 part by weight of a mixture of dipentaerythritol pentaacrylate with dipentaerythritol hexaacrylate "DPHA" (manufactured by NIPPON KAYAKU Co., Ltd.), 1.5 parts by weight of a silane coupling agent "KBM-5103" (3-acryloxypropyltrimethoxysilane, manufactured by SHIN-ETSU CHEMICAL Co., Ltd.), 0.4 part by weight a photo radical generating agent "Irgacure 907" (manufactured by Ciba Specialty Chemicals) and 30 parts by weight of methoxypropanol. Then the resultant mixture was diluted with methyl ethyl ketone to give a solid concentration of 10% by weight. Thus, a coating solution of composition for forming antistatic layer (AS-7) was prepared.

Comparative Example 9-1

Construction of Antireflective Film Sample 901

(1) Formation of Hard Coat Layer

A triacetylcellulose film of 80 μm in thickness (FUJITAC TAC-TD80U, manufactured by FUJI PHOTOFILM Co., Ltd.) was unwound in a rolled state. Then the coating solution of composition for forming hard coat layer (J-1) as described above was applied by using a microgravure roll (diameter: 50 mm) having a gravure pattern of a line density of 180 lines/in. and a depth of 40 µm and a doctor blade at a gravure roll rotation speed of 30 rpm and a conveying speed of 35 m/min. After drying at 60° C. for 150 seconds, the coating layer was hardened by irradiating under nitrogen-purge with ultraviolet light at 120 mJ/cm$^2$ by using an air-cool metal halide lamp (160 W/cm, manufactured by EYEGRAPHICS Co., Ltd.) at an illuminance of 400 mW/cm$^2$. Thus a hard coat layer of 5.6 µm in thickness was formed followed by winding.

(2) Formation of Low Refractive Index Layer

The coating solution of composition for forming low refractive index layer (H-1) was applied on the hard coat layer formed above with the use of a bar coater. After drying at 80° C. for 5 minutes, it was hardened at 120° C. for 20 minutes. Then it was irradiating under nitrogen-purge with ultraviolet light at 200 mJ/cm$^2$ by using an air-cool metal halide lamp (240 W/cm, manufactured by EYEGRAPHICS Co., Ltd.) at an illuminance of 400 mW/cm$^2$. Thus a low refractive index layer of 100 nm in thickness was formed followed by winding. The sample thus obtained was referred to as antireflective film sample 901.

Examples 9-1 to 14

Construction of Antireflective Film Samples 902 to 915

Antireflective film samples 902 to 915 were constructed as in the construction of the antireflective film sample 901 in COMPARATIVE EXAMPLE 9-1 but using, as substitutes for the coating solution of composition for forming hard coat layer (J-1) and the coating solution of composition for forming low refractive index layer (H-1), each of the coating solutions of composition for forming hard coat layer and the coating solutions of composition for forming low refractive index layer combined as listed in TABLE 6.

Example 9-15

Construction of Antireflective Film Sample 916

A hard coat layer was formed as in construction of the antireflective film sample 901 in COMPARATIVE EXAMPLE 9-1 but using the coating solution of composition for forming hard coat layer (J-12) as a substitute for the coating solution of composition for forming hard coat layer (J-1). The coating solution of composition for forming low refractive index layer (H4) was applied on the hard coat layer formed above with the use of a bar coater. After drying at 80° C. for 5 minutes, it was hardened at 120° C. for 20 minutes. Then it was irradiating under nitrogen-purge with ultraviolet light at 200 mJ/cm$^2$ by using an air-cool metal halide lamp (240 W/cm, manufactured by EYEGRAPHICS Co., Ltd.) at an illuminance of 400 mW/cm$^2$. Thus a low refractive index layer of 100 nm in thickness was formed followed by winding.

Next, the coating solution of composition for forming antifouling layer (G-1) employed in EXAMPLE 3 was applied on the low refractive index layer formed above and dried at 120° C. for 1 minute to form an antifouling layer of 8 nm in thickness. Thus, an antireflective film sample 916 was prepared.

Example 9-16

Construction of Antireflective Film Sample 917

A hard coat layer was formed as in construction of the antireflective film sample 901 in COMPARATIVE EXAMPLE 9-1 but using the coating solution of composition for forming hard coat layer (J-12) as a substitute for the coating solution of composition for forming hard coat layer (J-1). The coating solution of composition for forming antistatic layer (AS4) was applied on the hard coat layer formed above so as to give a layer thickness after drying of 150 nm. Then it was irradiating under nitrogen-purge with ultraviolet light at 120 mJ/cm$^2$ by using an air-cool metal halide lamp (240 W/cm, manufactured by EYEGRAPHICS Co., Ltd.) at an illuminance of 400 mW/cm$^2$. On the antistatic layer thus formed, a coating solution of composition for forming low refractive index layer (H-1) was applied and hardened as in the case of the sample 901 in COMPARATIVE EXAMPLE 9-1 to give a sample 917.

Examples 9-17 to 19 and Comparative Example 9-2

Construction of Antireflective Film Samples 918 to 921

Antireflective film samples 918 to 921 were constructed as in the construction of the antireflective film sample 917 in EXAMPLE 9-16 but using the coating solutions of composition for forming antistatic layer as listed in TABLE 6 each as a substitute for the coating solution of composition for forming antistatic layer (AS-3).

[Evaluation of Antireflective Film]

The antireflective films thus obtained were evaluated in the following items.

(1) Surface Roughness of Hard Coat Layer

Before forming the low refractive index layer, the Ra of the hard coat layer was determined by the method specified in JIS B-0601. In the antireflective film samples 917 to 921, the antistatic layer was referred to as a hard coat layer having an antistatic effect.

(2) Critical Load in Rubbing Test with Cotton Swab Moistened with Water After Exposure to Ozone Each sample was processed to give a polarizing plate which was then stored in the environment of an ozone concentration of 10 ppm at 30° C. and 60% RH for 192 hours (8 days) and then taken out into the atmosphere. A cotton swab (HEALTH REFRE® manufactured by TOYO EIZAI) was fixed to the rubbing head of a rubbing tester. In a flat dish, the sample was fixed by clipping at the top and the bottom. Then the sample and the cotton swab were dipped in water at 25° C. at a room temperature of 25° C. Under applying a load on the cotton swab, rubbing was reciprocally repeated 20 times.

Rubbing distance (one way): 1 cm.

Rubbing speed: about two reciprocations per sec.

After rubbing, water on the sample surface was evaporated. Then it was examined with the naked eye whether or not the layer peeled off. The test was repeated 10 times for each sample. The initial load was 100 g and the load was increased by 50 g until layer-peeling was observed 5 times or more. Then the load under which the layer-peeling occurred less than 5 times in repeating the test 10 times was defined as the critical load. The layer-peeling was judged by observing a change in the reflection state with the naked eye. A sample showing a larger critical load was referred as having the better scratch resistance.

TABLE 6 summarizes the coating solutions for forming layers in each of the antireflective film samples 901 to 921 and the evaluation results of the obtained antireflective film samples.

exposure to ozone were almost the same as the data of corresponding samples in EXAMPLE 9 and COMPARATIVE EXAMPLE 9.

This application is based on Japanese Patent application JP 2004-37859, filed Feb. 16, 2004, the entire content of which is hereby incorporated by reference, the same as if set forth at length.

TABLE 6

|  | Sample no. | Coating solution of composition for forming layer (no.) | | | | Mirror reflectivity (%) | Surface roughness of hard coat layer immediately below low refractive index layer (Ra) | Critical load in moistened cotton swab-rubbing test after ozone-exposure (g) |
|---|---|---|---|---|---|---|---|---|
|  |  | Hard coat layer | Antistatic layer | Low refractive index layer | Overcoat layer |  |  |  |
| C. Ex. 9-1 | 901 | J-1 | — | H-1 | — | 1.30 | 0.004 | 300 |
| Ex. 9-1 | 902 | J-2 | — | H-1 | — | 1.30 | 0.03 | 400 |
| Ex. 9-2 | 903 | J-3 | — | H-1 | — | 1.30 | 0.04 | 650 |
| Ex. 9-3 | 904 | J-4 | — | H-1 | — | 1.30 | 0.03 | 400 |
| Ex. 9-4 | 905 | J-5 | — | H-1 | — | 1.30 | 0.04 | 550 |
| Ex. 9-5 | 906 | J-6 | — | H-1 | — | 1.30 | 0.02 | 600 |
| Ex. 9-6 | 907 | J-7 | — | H-1 | — | 1.30 | 0.02 | 650 |
| Ex. 9-7 | 908 | J-8 | — | H-1 | — | 1.30 | 0.02 | 600 |
| Ex. 9-8 | 909 | J-9 | — | H-1 | — | 1.30 | 0.02 | 550 |
| Ex. 9-9 | 910 | J-10 | — | H-1 | — | 1.30 | 0.04 | 700 |
| Ex. 9-10 | 911 | J-11 | — | H-1 | — | 1.30 | 0.03 | 550 |
| Ex. 9-11 | 912 | J-6 | — | H-2 | — | 1.30 | 0.02 | 650 |
| Ex. 9-12 | 913 | J-6 | — | H-3 | — | 1.30 | 0.02 | 700 |
| Ex. 9-13 | 914 | J-10 | — | H-3 | — | 1.30 | 0.03 | 750 |
| Ex. 9-14 | 915 | J-12 | — | H-3 | — | 1.30 | 0.01 | 700 |
| Ex. 9-15 | 916 | J-12 | — | H-4 | G-1 | 1.31 | 0.01 | 800 |
| Ex. 9-16 | 917 | J-12 | AS-3 | H-1 | — | 1.05 | 0.007 | 400 |
| Ex. 9-17 | 918 | J-12 | AS-4 | H-1 | — | 1.00 | 0.04 | 500 |
| Ex. 9-18 | 919 | J-12 | AS-5 | H-1 | — | 0.98 | 0.07 | 750 |
| Ex. 9-19 | 920 | J-12 | AS-6 | H-1 | — | 0.95 | 0.18 | 1000 |
| C. EX. 9-2 | 921 | J-12 | AS-7 | H-1 | — | 0.95 | 0.25 | 350 |

The results given in TABLE 6 clearly indicate the following facts.

By elevating the surface roughness of the hard coat layer on which the low refractive index layer was formed as in the samples 902 to 904, the scratch resistance after the ozone-exposure was improved {comparing the sample 901 (COMPARATIVE EXAMPLE 9-1) with the samples 902 to 904 (EXAMPLES 9-1 to 9-3)}. In the samples having the antistatic layer containing antistatic particles immediately below the low refractive index layer, in particular, the scratch resistance after the ozone-exposure was remarkably improved with an increase in the surface roughness within the range according to the invention {the samples 917 to 921 (EXAMPLES 9-16 to 19)}.

It is also understood that the samples having the hard coat layer containing an organic silyl compound, its derivative or a polyfunctional isocyanate showed remarkably improved tolerance to ozone without elevating the surface roughness {the sample 901 (COMPARATIVE EXAMPLE 9-1) with the samples 906 to 916 (EXAMPLES 9-5 to 15)}.

Example 10 and Comparative Example 10

Samples 1001 to 1011 were constructed as in the construction of the samples 901 to 911 but using no "SEAHOSTAR KE-P 150" having an average particle size of 1.5 μm in the hard coat layer.

As the results of the evaluation performed in accordance with EXAMPLE 9, it was found out that the data on reflectivity, surface roughness (Ra) of the hard coat layer immediately below the low refractive index layer and critical load in rubbing test with cotton swab moistened with water after

What is claimed is:

1. An antireflective film comprising a transparent substrate and a low refractive index layer formed by coating a low refractive index layer-forming composition, wherein the low refractive index layer-forming composition contains at least one of a hydrolysate of an organosilyl compound represented by the following formula (1) and a partial condensation product of the hydrolysate, and an outermost face of the antireflective film has a centerline surface roughness Ra of from 0.005 to 0.20 μm:

$$R^{11}{}_m Si(X^{11})_n \tag{1}$$

wherein $X^{11}$ represents —OH, a halogen atom, —OR$^{12}$ or —OCOR$^{12}$ in which R$^{12}$ represents an alkyl group; R$^{11}$ represents an alkyl group, an alkenyl group or an aryl group; and m and n are each a positive integer provided that m+n is 4; the antireflective film further comprising a transparent antistatic layer containing an electrically conductive material, wherein a common logarithm of a surface resistance of the antireflective film is 12 or less, wherein the antistatic layer is a hard coat layer having an antistatic effect and has an average centerline surface roughness Ra of from 0.007 to 0.20 μm, and wherein the low refractive index layer contains inorganic particles having a refractive index of from 1.17 to 1.40, having an average particle size of from 30% to 120% of a thickness of the low refractive index layer and having a hollow structure.

2. The antireflective film according to claim 1, wherein the outermost face has a surface free energy of 26 mJ/m$^2$ or less.

3. The antireflective film according to claim 1, further comprising a hard coat layer, wherein at least one layer constituting the antireflective film is a light diffusion layer comprising a light-transmitting resin and light-transmitting particles which have an average particle size of from 0.1 to 5 μm, in which a difference in refractive index between the light-transmitting particles and the light-transmitting resin is from 0.02 to 0.2, and the light diffusion layer contains from 3 to 30% by weight of the light-transmitting particles, based on a total solid content of the light diffusion layer.

4. The antireflective film according to claim 3, wherein the hard coat layer is formed by coating a hard coat layer-forming composition which contains at least one of an organosilyl compound represented by the formula (1), a hydrolysate of the organosilyl compound and a partial condensation product of the hydrolysate.

5. The antireflective film according to claim 4, wherein the hard coat layer-forming composition contains a polyfunctional isocyanate compound.

6. The antireflective film according to claim 1, which contains a thixotropic agent.

7. The antireflective film according to claim 1, further comprising an antifouling layer so that the transparent substrate, the low refractive index layer and the antifouling layer are in this order.

8. The antireflective film according to claim 1, wherein the low refractive index layer is provided on an alkali-treated face.

9. The antireflective film according to claim 1, wherein, in a rubbing test with cotton swab moistened with water, a critical load of a surface of the antireflective film after exposing to 10 ppm of ozone for 192 hours is 400 g or more.

10. A polarizing plate comprising the antireflective film according to claim 1.

11. The polarizing plate according to claim 10, wherein a Re retardation value of at least one film constituting the polarizing plate is from 20 to 70 nm and a Rth retardation value thereof is from 70 to 400 nm.

12. The polarizing plate according to claim 10, wherein, in a rubbing test with cotton swab moistened with water, a critical load of a surface of the antireflective film after exposing to 10 ppm of ozone for 192 hours is 400 g or more.

13. A display unit comprising the polarizing plate according to claim 10.

14. A display unit comprising the antireflective film according to claim 1.

15. The display unit according to claim 14, wherein, in a rubbing test with cotton swab moistened with water, a critical load of a surface of the antireflective film after exposing to 10 ppm of ozone for 192 hours is 400 g or more.

* * * * *